(12) United States Patent  (10) Patent No.: US 8,413,419 B2
Mungas et al.  (45) Date of Patent: Apr. 9, 2013

(54) REGENERATIVELY COOLED POROUS MEDIA JACKET

(75) Inventors: Greg Mungas, Arcadia, CA (US); David J. Fisher, Tehachapi, CA (US); Adam Pollok London, San Francisco, CA (US); Jack Merrill Fryer, Huntington Beach, CA (US)

(73) Assignee: Firestar Engineering, LLC, Mojave, CA (US)

( * ) Notice: Subject to any disclaimer, the term of this patent is extended or adjusted under 35 U.S.C. 154(b) by 791 days.

(21) Appl. No.: 12/633,770

(22) Filed: Dec. 8, 2009

(65) Prior Publication Data

US 2010/0205933 A1 Aug. 19, 2010

Related U.S. Application Data

(60) Provisional application No. 61/120,776, filed on Dec. 8, 2008.

(51) Int. Cl.
*F02K 99/00* (2009.01)
*F02K 9/00* (2006.01)
*F02K 9/64* (2006.01)

(52) U.S. Cl.
USPC .................................. 60/267; 60/206; 60/257

(58) Field of Classification Search ............ 60/204, 60/206, 257, 259, 260, 265–267, 730, 770, 60/771; 239/127.1, 132.3; 137/15.1, 15.2; 244/53 B
See application file for complete search history.

(56) References Cited

U.S. PATENT DOCUMENTS

| | | | |
|---|---|---|---|
| 1,061,847 A | 5/1913 | Ionides, Jr. | |
| 1,102,653 A | 7/1914 | Goddard | |
| 1,103,503 A | 7/1914 | Goddard | |
| 1,586,195 A | 5/1926 | Hall | |
| 2,609,281 A | 9/1952 | Smith | |
| 3,243,272 A | 3/1966 | Schmitz | |
| 3,460,759 A * | 8/1969 | Gregory et al. | 239/127.1 |
| 3,512,556 A | 5/1970 | McKhann | |
| 3,779,714 A | 12/1973 | Nadkarni et al. | |

(Continued)

FOREIGN PATENT DOCUMENTS

| EP | 1500880 A2 | 1/2005 |
|---|---|---|
| GB | 1029894 | 5/1996 |

(Continued)

OTHER PUBLICATIONS

International Searching Authority, International Search Report, PCT/US2011/021917, dated Mar. 14, 2011, 2 pages.

(Continued)

*Primary Examiner* — Ehud Gartenberg
*Assistant Examiner* — Arun Goyal
(74) *Attorney, Agent, or Firm* — HolzerIPLaw, PC

(57) ABSTRACT

The fluid and heat transfer theory for regenerative cooling of a rocket combustion chamber with a porous media coolant jacket is presented. This model is used to design a regeneratively cooled rocket or other high temperature engine cooling jacket. Cooling jackets comprising impermeable inner and outer walls, and porous media channels are disclosed. Also disclosed are porous media coolant jackets with additional structures designed to transfer heat directly from the inner wall to the outer wall, and structures designed to direct movement of the coolant fluid from the inner wall to the outer wall. Methods of making such jackets are also disclosed.

26 Claims, 18 Drawing Sheets

U.S. PATENT DOCUMENTS

| | | | |
|---|---|---|---|
| 4,398,527 A | 8/1983 | Rynbrandt | |
| 4,446,351 A | 5/1984 | Kawaguchi et al. | |
| 4,458,595 A | 7/1984 | Gerrish, Jr. et al. | |
| 4,703,620 A | 11/1987 | Niino et al. | |
| 4,707,184 A | 11/1987 | Hashiguchi et al. | |
| 4,736,676 A | 4/1988 | Taylor | |
| 4,963,490 A | 10/1990 | Churchouse et al. | |
| 5,203,296 A | 4/1993 | Hart | |
| 5,305,726 A | 4/1994 | Scharman et al. | |
| 5,466,313 A | 11/1995 | Brede et al. | |
| 5,477,613 A | 12/1995 | Bales et al. | |
| 5,608,179 A | 3/1997 | Voecks et al. | |
| 5,738,061 A | 4/1998 | Kawamura | |
| 5,768,885 A | 6/1998 | Johnson et al. | |
| 5,855,827 A | 1/1999 | Bussing et al. | |
| 6,047,541 A | 4/2000 | Hampsten | |
| 6,151,887 A | 11/2000 | Haidn et al. | |
| 6,179,608 B1 | 1/2001 | Kraemer et al. | |
| 6,336,318 B1 | 1/2002 | Falce et al. | |
| 6,606,851 B1 | 8/2003 | Herdy, Jr. et al. | |
| 6,779,335 B2 | 8/2004 | Herdy, Jr. et al. | |
| 6,799,417 B2 | 10/2004 | Hewitt | |
| 6,895,743 B1 | 5/2005 | McElheran et al. | |
| 6,896,512 B2 | 5/2005 | Rattner et al. | |
| 6,915,834 B2 | 7/2005 | Knott et al. | |
| 6,931,832 B2 | 8/2005 | Berg et al. | |
| 6,984,273 B1 | 1/2006 | Martin et al. | |
| 7,056,114 B2 | 6/2006 | Brooker | |
| 7,124,574 B2 | 10/2006 | Horn et al. | |
| 7,370,469 B2 | 5/2008 | Watkins | |
| 7,377,948 B2 | 5/2008 | Faris | |
| 7,418,814 B1 | 9/2008 | Greene | |
| 7,451,751 B2 | 11/2008 | Atherley | |
| 7,475,561 B2 | 1/2009 | Smolko et al. | |
| 7,585,381 B1 | 9/2009 | Zubrin | |
| 2004/0055277 A1 | 3/2004 | Kline et al. | |
| 2004/0081783 A1 | 4/2004 | Prince | |
| 2004/0253624 A1 | 12/2004 | Smith et al. | |
| 2006/0121080 A1 | 6/2006 | Lye et al. | |
| 2007/0169461 A1 | 7/2007 | Koerner | |
| 2008/0173020 A1 | 7/2008 | Mungas et al. | |
| 2008/0209872 A1 | 9/2008 | Samaras et al. | |
| 2009/0071434 A1 | 3/2009 | MacMillan et al. | |
| 2009/0120060 A1 | 5/2009 | Coste | |
| 2009/0126514 A1 | 5/2009 | Burroughs et al. | |
| 2009/0133788 A1 | 5/2009 | Mungas et al. | |
| 2009/0260363 A1 | 10/2009 | Moriarty | |
| 2009/0266049 A1 | 10/2009 | Mittendorf | |
| 2009/0288390 A1* | 11/2009 | Pavia et al. | 60/267 |

FOREIGN PATENT DOCUMENTS

| | | | |
|---|---|---|---|
| WO | 0151433 A1 | 7/2001 | |
| WO | 03028069 A2 | 4/2003 | |
| WO | 2004089564 A1 | 10/2004 | |
| WO | 2005037167 A2 | 4/2005 | |
| WO | 2007052084 A1 | 5/2007 | |

OTHER PUBLICATIONS

International Searching Authority, Written Opinion, PCT/US2011/021917, dated Mar. 14, 2011, 7 pages.

International Searching Authority, International Search Report for PCT/US2011/031137, dated Jun. 20, 2011, 2 pages.

International Searching Authority, Written Opinion for PCT/US2011/031137, dated Jun. 20, 2011, 6 pages.

"aRocket", an amateur rocketry discussion forum on http://exrocktry.net/mailman/listinfo/arocket, Dec. 31, 2009.

Balasubramanyam, M.S. et al., "Catalytic Ignition of Nitrous Oxide with Propane/Propylene Mixtures for Rocket Motors," 41st AIAA/ASME/SAE/ASEE Joint Propulsion Conference & Exhibit, Jly. 10-13, 2005, Tucson, AZ, AIAA Paper No. AIAA 2005-3919, pp. 1-8.

Boysan, M.E. et al., "Comparison of Different Aspect Ratio Cooling Channel Designs for a Liquid Propellant Rocket Engine," Recent Advances in Space Technologies, 2007, RAST '07, 3rd International Conference, pp. 225-230.

Burkhardt, W.M. et al., Abstract—"Formed platelets for low cost regeneratively cooled rocket combustion chambers," AIAA, SAE, ASME, and ASEE, Joint Propulsion Conference and Exhibit, 28th, Nashville, TN, Jul. 6-8, 1992, SAO/NASA ADS Physics Abstract Service, http://adsabs.harvard.edu/abs/1992jpnt.confRT...B, 2 pages.

Dong (Keun) Kim et al., "Characterization/Modeling of Wire Screen Insulation for Deep-Water Pipes," Proceedings of the 2006 AIAA/ASME Joint Heat Transfer Conference, Jun. 5-8, 2006, San Francisco, CA, AIAA Paper No. AIAA-2006-3135, pp. 1-11.

Haack, David P. et al., "Novel Lightweight Metal Foam Heat Exchangers," http://fuelclellmarkets.com/content/images/articles/white_paper1.pdf, downloaded Jan. 11, 2011, 7 pages.

International Searching Authority, U.S. Patent and Trademark Office; International Search Report for PCT/US2007/086410; dated Oct. 1, 2008, 2 pages.

International Searching Authority, U.S. Patent and Trademark Office; International Search Report for PCT/US2008/083039; dated Mar. 24, 2009, 2 pages.

International Searching Authority, U.S. Patent and Trademark Office; International Search Report for PCT/US2009/067219, dated Aug. 6, 2010, 3 pages.

International Searching Authority, U.S. Patent and Trademark Office; International Search Report for PCT/US2010/041234, dated Sep. 3, 2010, 2 pages.

International Searching Authority, U.S. Patent and Trademark Office; International Search Report for PCT/US2010/041249, dated Sep. 7, 2010, 2 pages.

International Searching Authority, U.S. Patent and Trademark Office; International Search Report for PCT/US2010/041255, dated Sep. 14, 2010, 2 pages.

International Searching Authority, U.S. Patent and Trademark Office; International Search Report for PCT/US2010/041259, dated Nov. 23, 2010, 3 pages.

International Searching Authority, U.S. Patent and Trademark Office; Written Opinion for PCT/US2007/086410; dated Oct. 1, 2008, 7 pages.

International Searching Authority, U.S. Patent and Trademark Office; Written Opinion for PCT/US2008/083039; dated Mar. 24, 2009, 6 pages.

International Searching Authority, U.S. Patent and Trademark Office; Written Opinion for PCT/US2010/041234, dated Sep. 3, 2010, 5 pages.

International Searching Authority, U.S. Patent and Trademark Office; Written Opinion for PCT/US2010/041249, dated Sep. 7, 2010, 9 pages.

International Searching Authority, U.S. Patent and Trademark Office; Written Opinion for PCT/US2010/041255, dated Sep. 14, 2010, 6 pages.

International Searching Authority, U.S. Patent and Trademark Office; Written Opinion for PCT/US2010/041259, dated Nov. 23, 2010, 6 pages.

Kolb et al, "Micro-structured reactors for gas phase reactions," Chemical Engineering Journal (2004), vol. 98, pp. 1-38.

Mahjoob, Shadi et al., "A Synthesis of Fluid and Thermal Transport Models for Metal Foam Heat Exchangers," International Journal of Heat and Mass Transfer 51 (2008), pp. 3701-3711.

Marchi, Carlos Henrique et al., "Numerical Solutions of Flows in Rocket Engines with Regenerative Cooling," published in Numerical Heat Transfer, Part A: Applicaltions, vol. 45, Issue 7, Apr. 2004, pp. 699-717.

Mungas, G. et al., "NOFB Monopropulsion System for Lunar Ascent Vehicle Utilizing Plug Nozzle Ascent Engine," The Johns Hopkins University, Chemical Propulsion Information Analysis Center, 2008.

Naraghi, M.H. et al., Dual Regenerative Cooling Circuits for Liquid Rocket Engines (Preprint), 42nd AIAA/ASME/SAE/ASEE Joint Propulson Conference & Exhibit, Jul. 9-12, 2006, Sacramento, CA, 18 pages.

Raffray, A.R. et al., "MERLOT: A Model for Flow and Heat Transfer through Porous Media for High Heat Flux Applications," Fusion Division, Center for Energy Research, University of California, San Diego, La Jolla, CA, Nov. 2001, 32 pages.

Raffray, A.R. et al., "Modeling Flow and Heat Transfer Through Porous Media for High Heat Flux Applications," University of California Energy Institute, Berkeley, CA, Oct. 2002, 19 pages.

Wikipedia, "Nitrous Oxide," http://en.wikipedia.org/wiki/Nitrous_oxide, retrieved Mar. 16, 2010.

Wikipedia, "Rocket engine," http://en.wikipedia.org/wiki/Rocket_engine, retrieved Jul. 21, 2009, 21 pages.

Wood et al., "Porous burners for lean-burn applications," Progress in Energy and Combustion Science (2008), vol. 34, pp. 667-684.

Yuan, K. et al., "Enhancement of Thrust Chamber Cooling with Porous Metal Inserts," 41st AIAA/ASME/SAE/ASEE Joint Propulsion Conference & Exhibit, Jul. 10-13, 2005, Tucson, AZ, 14 pages.

* cited by examiner

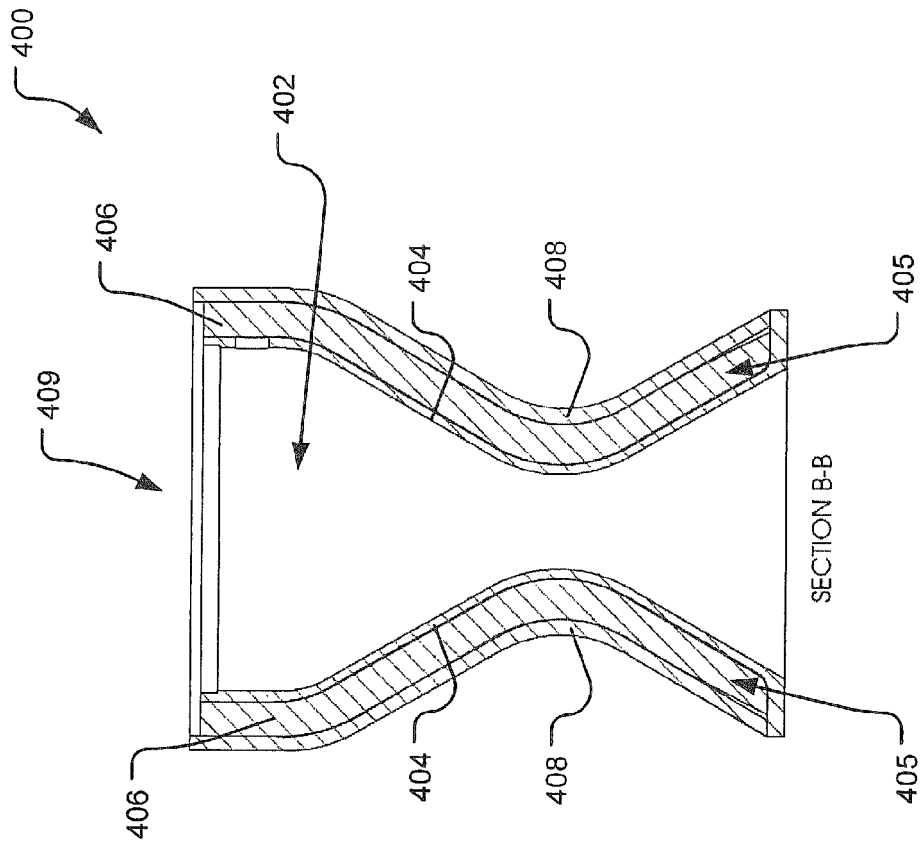
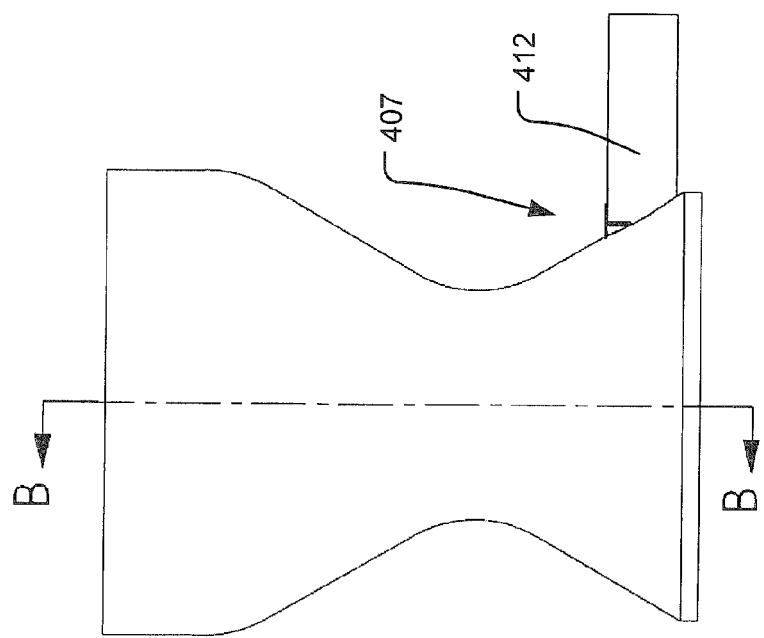
Fig. 4B
Fig. 4A

REGENERATIVELY COOLED POROUS MEDIA JACKET

CROSS-REFERENCE TO RELATED APPLICATIONS

The present application claims benefit of priority to U.S. Provisional Patent Application No. 61/120,776, entitled "Regeneratively Cooled Porous Media Jacket" and filed on Dec. 8, 2008, specifically incorporated by reference herein for all that it discloses or teaches.

This technology was funded in part under NASA contract NNX09CB12C administered by NASA/Shared Services Center. The U.S. Government may have certain rights in the invention.

BACKGROUND

Research in rocketry has led to numerous improvements in design of rocket engines, propellants, and power. At least one problem has, however, remained. Rocket engines generate both high temperature combustion gases and an enormous amount of heat release during operation. It is a difficult engineering challenge to design materials, structures, and cooling methods to handle such extreme operating temperatures and/or to dissipate heat from lower temperature materials exposed to the hot combustion gases without loss of performance of the engine and without loss of integrity of the engine structure itself. During engine operation, the temperatures involved may reach (and potentially exceed) 3450° K. (approximately 3200° C.). Without effective cooling, many materials typically cannot be used for the engine because the operating temperatures of the engine can approach or exceed the melting point of the materials or can cause the materials to operate in a temperature regime of a material where the structural properties are poor. Furthermore, the combustion gases in the gas boundary layer that is in contact with an internal combustion chamber surface typically are more corrosive to these materials because of the existence of highly reactive gas molecules at elevated temperature compared to lower temperatures. Cooling the gas boundary layer that is in contact with an internal combustion chamber surface can decrease the concentration of reactive species and therefore reduce the chemical corrosive nature of the combustion gases. In addition, even after engine shut-down, unless the engine was sufficiently cooled during the engine operation, residual heat contained in the engine may soak-back and damage or destroy temperature sensitive components elsewhere in the engine system (e.g., actuated engine valves that have low temperature valve seats, solenoids susceptible to overheating, or electrical wiring with standard insulation that may melt at typical engine temperatures or any combination of the above). Existing cooling approaches fail to provide adequate cooling during and/or after engine operation.

SUMMARY

Implementations described and claimed herein address the foregoing problems by providing materials and methods for regeneratively cooled rocket engines, including rocket engines operating at very high temperatures. A regeneratively cooled jacket encompasses a combustion chamber of the engine, and a coolant fluid flows through a porous-media-filled channel formed between the exterior of the jacket and the interior of the jacket. In one implementation, the interior of the jacket forms the inner bounds of the combustion chamber. The channel includes materials having porous media elements to allow coolant fluid to flow through the channel. In some implementations, the materials include low temperature nonrefractory metals, such as nickel or aluminum.

The coolant fluid disclosed herein is exemplified with the nitrous oxide fuel blend monopropellant disclosed in related U.S. patent application Ser. No. 12/268,266, entitled "Nitrous Oxide Fuel Blend Monopropellants" and filed on Dec. 8, 2008, which is herein incorporated by reference, but other mono or bipropellants and other fluids may also be employed. In addition, the type of ignition system useable with the regeneratively cooled jacket may vary with the type of propellant used. The metal useable with the regeneratively cooled jacket may also vary with the type of propellant used, as it may be desired in one implementation that the metal be noncatalytic with the particular propellant.

Rocket engines using the regeneratively cooled jacket disclosed herein may be used for cooling large rocket engines such as those in launch vehicles, small rocket engines such as those used to control attitude in spacecraft or satellites, or other engine applications. It should be noted that gas generation, work extraction (for example, through pistons or turbines), and substrate heating are also valid uses for this technology.

"About" and "approximately" are intended to specify "plus or minus 10%" throughout this disclosure. Other implementations are also described and recited herein.

BRIEF DESCRIPTIONS OF THE DRAWINGS

FIGS. 4A & 4B illustrate the cross sectional geometry of the coolant path of an example regeneratively cooled porous media jacket.

DETAILED DESCRIPTION

Figure 1:
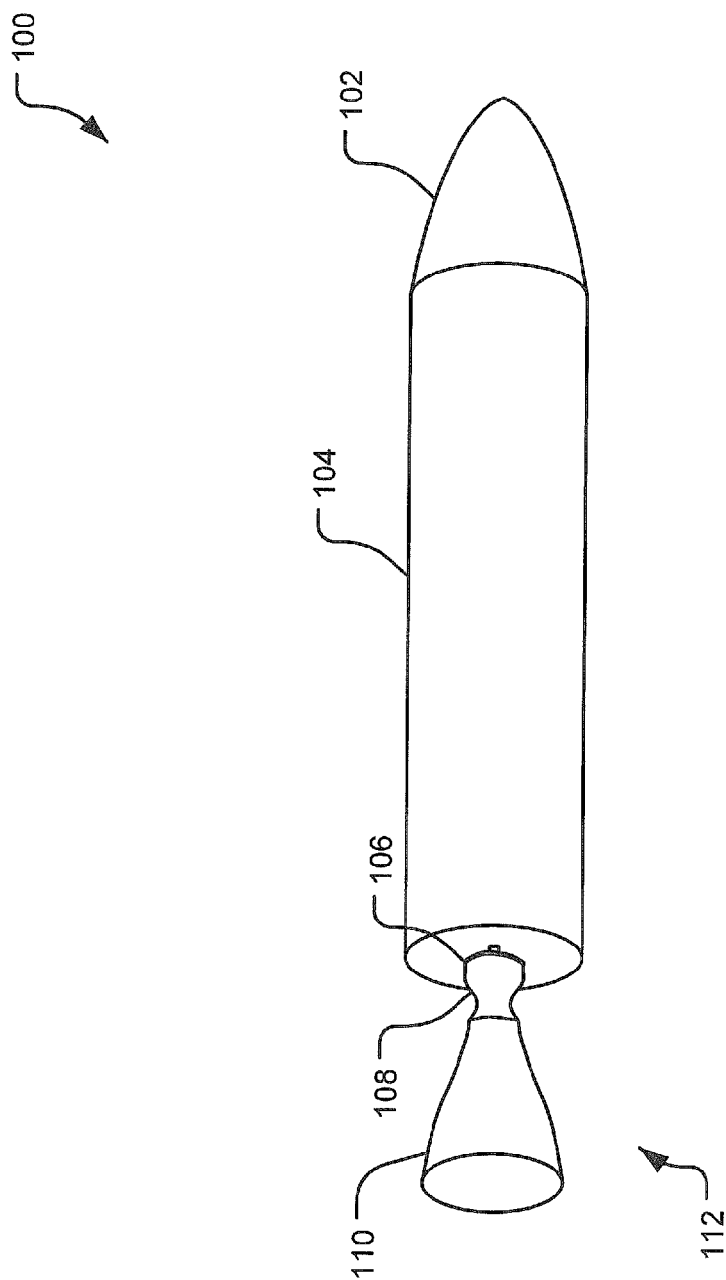
FIG. 1 illustrates a launch vehicle using an example regeneratively cooled rocket engine.
Figure 2:
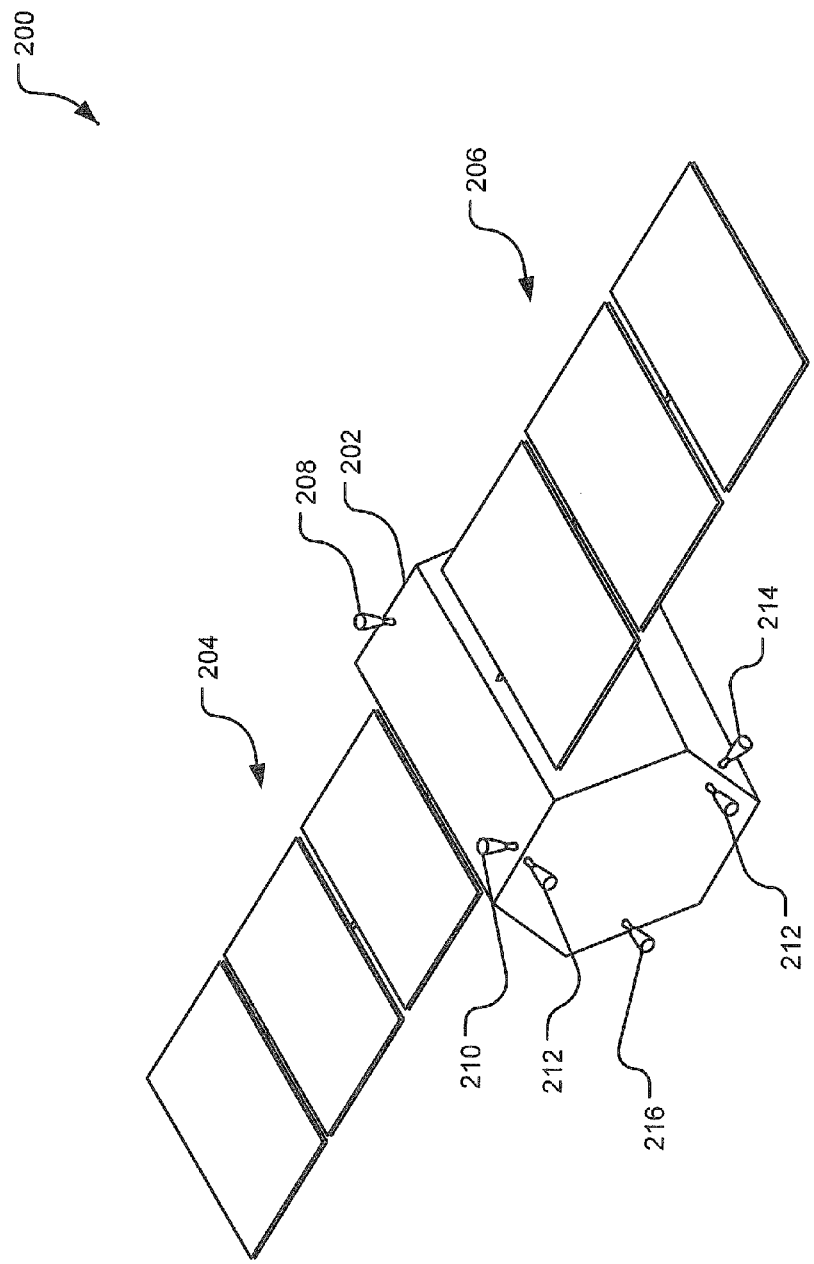
FIG. 2 illustrates a satellite using an example regeneratively cooled rocket engine.

FIGS. 1 and 2 illustrate examples of regeneratively cooled rocket engines disclosed herein for use with launch vehicles and attitude controls rocket engines, respectively. In FIG. 1, a rocket nose 102 is affix on a rocket body 104, which includes a propellant tank. An ignition interface 106 is located between the rocket body 104 and a combustion chamber 108, which feeds into an expansion nozzle 110. In the illustration, the rocket would be propelled from left to right. The combustion chamber 108 includes a regeneratively cooled porous media jacket through which coolant fluid (e.g., liquid or gas) can flow to cool the rocket engine 112.

In FIG. 2, a satellite 200 includes a satellite body 202 and two solar panels 204 and 206. A number of rocket engines 208, 210, 212, 214, and 216 are affixed to the satellite body 202 for use in controlling attitude in a satellite 200. Each rocket engine 208, 210, 212, 214, and 216 includes a regeneratively cooled porous media jacket through which coolant fluid (e.g., liquid or gas) can flow to cool the rocket engine.

Figure 3:
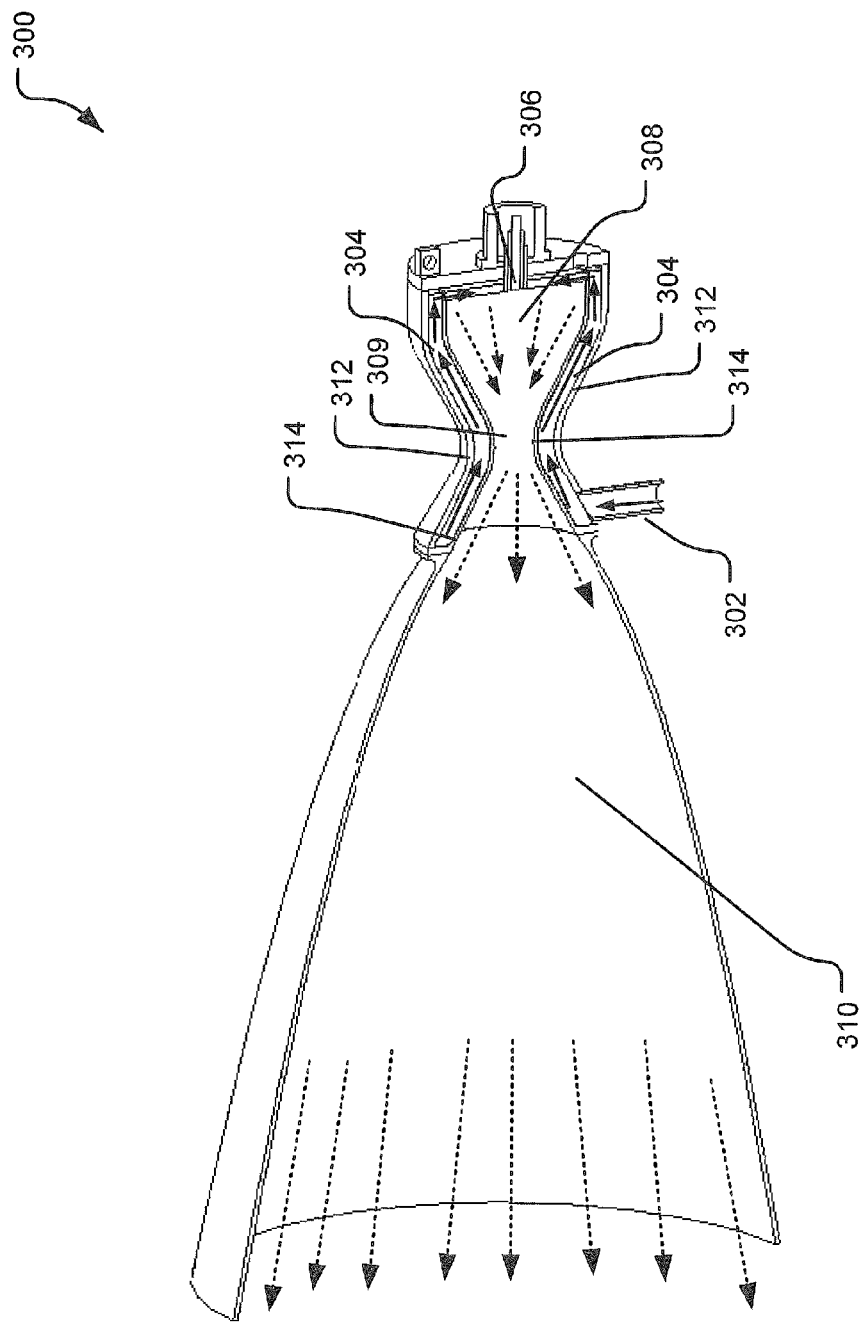
FIG. 3 illustrates the cross sectional geometry of an example thruster thermal model rocket engine incorporating a regeneratively cooled porous media jacket.

FIG. 3 demonstrates an example use of a regeneratively cooled engine 300 having a porous media jacket. In this implementation, one or more un-combusted propellants, acting as a coolant fluid, enter through an inlet tube 302 and travel through a channel 304 filled with porous media. The porous media fills the channel between the inner wall 314 and the outer wall 312 of the rocket engine 316 and is in thermal contact with both walls. The porous media functions to allow coolant flow through the channel 304 and to increase heat transfer from the combustion chamber 308 into the flowing coolant. The coolant flow is shown generally by the solid arrows.

The coolant/propellant then flows from the channel 304 across the injection head 306 and enters a combustion chamber 308 where an exothermic reaction takes place. As such, the cooling fluid ignites in the combustion chamber 308. The combustion gases travel through the throat constriction 309 and are accelerated by means of a contoured nozzle or expansion nozzle 310. The paths of the combusted gases are shown generally by the dashed arrows. By accelerating mass (e.g., combustion gases) through the expansion nozzle 310, thrust is generated. In addition to thrust generation, the regeneratively cooled jacket disclosed herein may also be used in systems in which a combustion chamber is used for gas generation, work extraction (for example through pistons or turbines), and substrate heating.

The pressure and temperature of the combusted gases are extremely high, particularly in the area of the throat 309. The inner wall 314 of the rocket engine 300 is heated by the combusted gases on its inner side (e.g., facing the combustion chamber) and cooled by the coolant/propellant flowing through the porous media on its outer side (e.g., facing the channel 304).

FIGS. 4A & 4B demonstrate an example implementation of a regeneratively cooled porous media jacket 400. An incoming coolant fluid (all or part of the combustion reactants/propellants) enters the engine through an inlet interface 412, which is represented as a tube, although other inlet interfaces may be employed. The fluid is distributed into a channel 405 within the jacket 400 through a manifold 407. The channel 405 is filled with porous media 406 to allow the fluid to flow through the channel 405 within the jacket 400. The fluid flows through the porous media 406 about the circumference of the channel 405 and from the inlet interface 412 to the end of the channel 405 near an injection head (not shown but located approximately at 409) along the contour of the combustion chamber and throat of the engine. The fluid path within the channel 405 is constrained by a combustion chamber wall 404 and an outside shell 408. Both the combustion chamber wall 404 and the outer shell 408 are membranes impermeable to fluid flow, keeping the fluid within the channel 405.

The porous media 406 and channel 405 terminate in the vicinity of the injector head. An injector head suitable for use with the intended propellants can be integrated with the jacket 400 at 409. The heat generated in the combustion chamber 402 is coupled to the incoming propellant thereby achieving relatively cool thruster temperatures (by rocket thruster standards).

In the field of rocketry, recognition that porous media would actually allow gas and two-phase propellants to be used as an engine coolant has not been previously realized and is not obvious. Unlike preliminary experiments that demonstrate bounding heat flux estimates for heat transfer into liquid coolants, in order to develop an engine capable of being 1) gas-cooled, 2) gas+liquid phase (two-phase) cooled, or 3) alternatively liquid-cooled but insensitive to liquid film boiling that generates gas (and corresponding hot spots) in a coolant jacket, requires a more complete system model and understanding of the complex fluids and heat transfer environment in an engine and porous media.

Exemplary parameters of the porous media jacket that can be varied in producing a jacket design with a gas-phase coolant include without limitation the jacket porosity, jacket thermal conductivity (through jacket material selection), the jacket effective pore diameter and general shape of the microfluidic passages guiding flow, and finally the jacket gap. These parameters are all varied and optimized in order to produce a jacket design that ensures sufficient cooling of critical engine surfaces of varying heat flux in an engine that are exposed to high gas temperatures while simultaneously minimizing the core pressure drop of the coolant moving through the jacket. For gas phase propellants, an additional constraint in the design of the jacket is the sonic velocity of the local pore space gases as they move through the microfluidic passages. Unlike liquid propellants, the local microfluidic gas phase velocities are limited to sonic velocities and experience different pressure drop characteristics that can be severe as the gases approach these sonic velocities. Therefore, in the design of the jacket, ensuring that the local pore gas velocity remains well below the sonic velocity is an additional overall jacket design constraint. Finally, the nature of bulk fluid convection as it moves through the porous media under a temperature gradient is relevant for determining enhancements in heat transfer. For example, in the vicinity of the throat, high speed fluid creates sufficient turbulence to help mix the fluids between the inner and outer jacket walls and enhance the jacket heat transfer characteristics. To get this same effect in sections of the jacket where coolants move slower, the jacket gap may be reduced (at the cost of enhanced pressure drop) or additional structures embedded in or as part of the porous medium may help force fluid mixing.

Sintering metal media can be formed of fine metal particles that are placed in a mold, mechanically compressed, and heated until the particles bond together. The level of compression and the temperature can be varied to produce materials with widely varying mechanical and flow characteristics. The material produced may range from a solid metallic part to a highly porous metal matrix, depending on the base media chosen and the sintering process. Porous metal matrix parts see wide use in filtration, dispersion, mixing, catalytic reaction, flow stabilization, and noise reduction. However, their use as heat exchangers is generally limited to applications where pressure drop is not a major design factor.

Metal foam is a broad term used to describe a matrix where both solid metal and open or closed cellular voids exist. Metal foams can be formed by a number of methods; the material is termed a "metal foam" as long as the final product contains voids. If the voids are connected, the foam is referred to as "open-celled", and if they are not, it is referred to as "closed-celled". Open-celled foams may comprise as little as 3% of starting media density with specific surface area approaching 50 $in^2/in^3$. In other words, as much as 97% of the volume within the matrix can contain open flow paths. A porous media of this type is said to be of 97% porosity ($\epsilon$). To minimize pressure drop while maximizing heat transfer surface area, porous media in the form of an open-celled foam appears promising to facilitate regenerative cooling for certain implementations of rocket thrusters and other engines.

The details of selection of characteristics of porous media and design of the regeneratively cooled jacket of rocket engines are discussed in Example 3 below. Briefly, the function of the rocket imposes certain limitations. For example, it is desirable to maintain pressure as the coolant flows out of the channel and into the engine's combustion chamber. As such, a large pressure drop from the inlet to the injection head is disadvantageous. If the pressure drop is too large, the engine size and mass can be increased to achieve a prescribed level of thrust, and in some extreme cases, the propellant may not be able to sustain combustion at an adequate level. In one implementation, if the pressure drop exceeds about 10% of the stored propellant pressure (for the entire propulsion system from the propellant tank to the combustion chamber), too much propellant may be left in the tank unused. A porous media having excessive porosity will not cause an unacceptably high pressure drop, but it will also not transfer heat efficiently out of the engine, as it is to a large extent, the volume of the porous media base material (not the fluid) within the jacket's channel that provides the primary heat transport mechanism from the combustion chamber. Thus, porosity is selected to provide the correct balance between pressure drop and heat transfer. The experiments disclosed herein have suggested that material having a porosity generally not exceeding about 80% for materials for rocket engines provide an acceptable balance. In some implementations, an acceptable porosity is about 50-60%. As noted above, and explained in detail in Example 3 below, a different porosity may be selected for use with different propellants, as individual propellants have different thermal conductivities and different temperatures above which they may be degraded.

The shape of the jacket is also a characteristic with functional constraints. The throat area is the area with the most heat that needs to be dissipated. However, because the inner/outer circumference of the porous material at the throat is the shorter than the inner/outer circumference of the porous material elsewhere along the engine's center axis, the annular cross-sectional area (normal to the flow) of the porous material at the throat is smaller than the annular cross-sectional area of porous material at any other point along the center axis if the jacket gap remains constant. Design of the jacket gap can ensure that jacket gases moving through the micro-fluidic passages near the engine throat remain well below local sonic velocities to avoid excessive jacket pressure drop. However, if the gap is too large, than the jacket cannot cool the engine throat sufficiently resulting in engine failure. In many engine configurations, this engine throat region typically has the highest heat transfer rates from the combustion chamber and is sensitive to the critical design parameters identified above. These relationships are quantified in Example 3.

Although a number of methods exist to manufacture porous media thrusters, some methods are better suited than others. Outlined herein are two exemplary methods by which similar outcomes can be achieved. Cost, repeatability, overall complexity, material availability, facility availability, thruster design, coolant fluid choice, and thruster geometry are likely discriminators in the choice between these methods. However, both methods can create equally functional thrusters. The first is a stacked and bonded lithographic method, and the second is a machined and assembled method. Both methods rely on the contour of the combustion chamber and porous media predefinition in order to initiate fabrication.

Example 1

Lithographic Method

Figure 5:
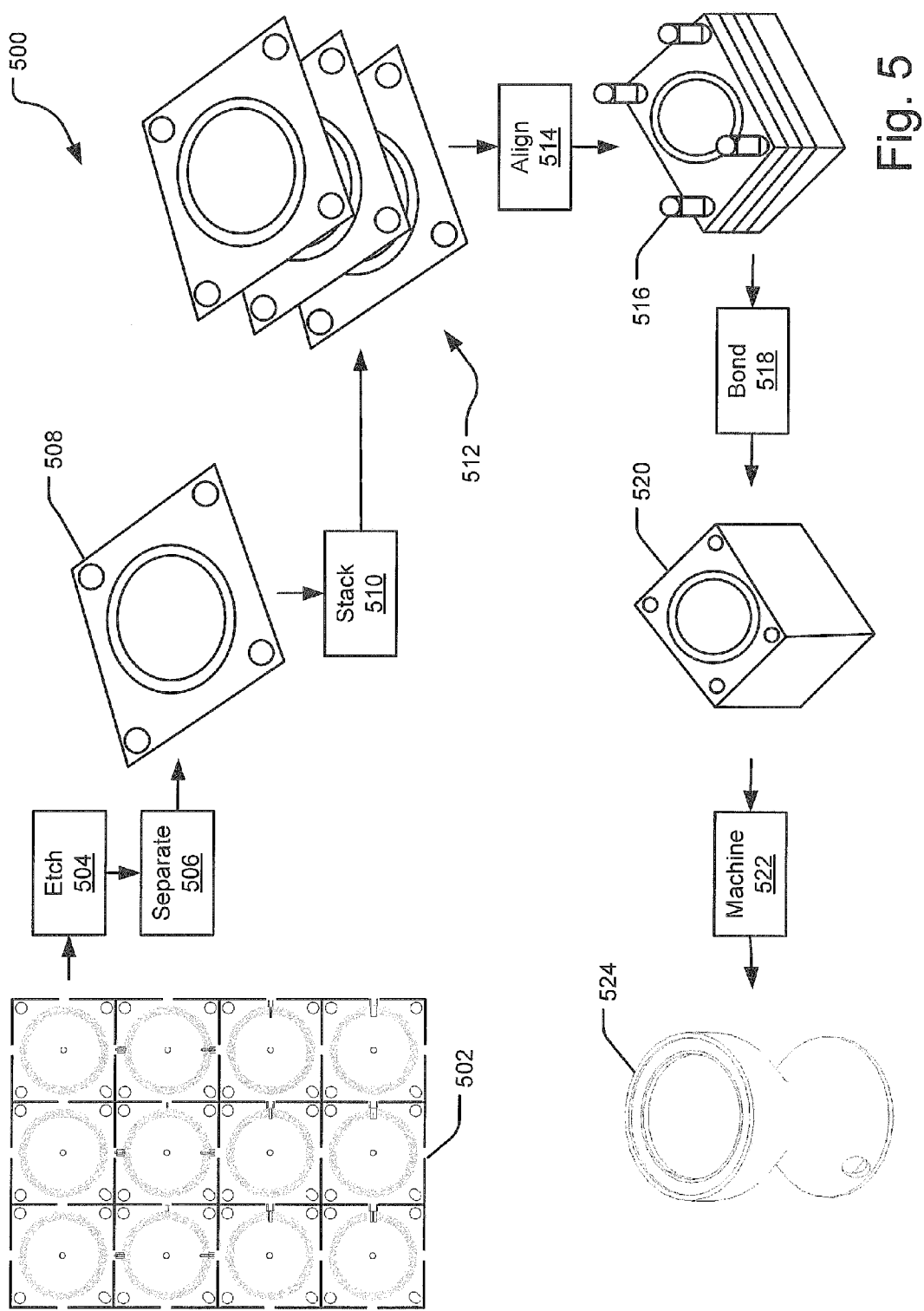
FIG. 5 illustrates a method of making an example regeneratively cooled porous media jacket using layers made by lithographic methods.

A photolithograph method of manufacturing is outlined in FIG. 5. In a stacked and bonded manufacturing lithographic method, finite layers are fabricated which, when stacked and bonded (along the axis of the engine), constitute the combustion chamber, porous media channel, and pressure shell (in order from the inside of the engine to the outside of the engine). Along the thrust axis of the thruster, the chamber contour changes in order to choke flow through the throat area and expand the flow through an expansion nozzle to generate thrust.

The inside dimension of the porous media varies to follow the combustion chamber contour, and the outside diameter of the porous media will vary to control the jacket gap and micro-fluidic geometry in order to control cooling while minimizing pressure drop through the jacket. The three dimensional porous media jacket is build up in stacked layers and typically fusion-bonded (applying heat and pressure) to allow the individual layers to bond and form a monolithic structure. The core of the engine as well as external engine features can subsequently be machined out from this monolithic block providing a sealed wall separating the combustion chamber from the jacket as well as a sealed outer jacket wall. To accommodate this three dimensional geometry in at least one implementation, each layer is positioned perpendicular to the thruster axis. The finite layers contain all the features that, when stacked on top of each other, create the desired thruster geometry in the resulting thruster. Therefore, the layers include features that allow for fluid flow from the entry port of the thruster to the entry of the porous media, as well as the features required to create the porous media at that particular layer location within the thruster.

The features defining the porous media will usually be contained within an annulus between the outside and inside diameter of the regenerative coolant path. Typically, the design is laid out in sheets, with each element of the sheet representing a single layer of the stacked structure. Each layer includes a ring of porous media material that has been etched or otherwise applied to the layer. Further, the diameter of the ring of porous media is specific to that layer and its position in the stack. For example, the diameter of the ring for a layer in the throat region of the stacked structure is smaller than the diameter of the ring for a layer near the injection head (e.g., near the top of jacket 400 in FIG. 4B, at 409). These changes in ring diameter effect the contour of the porous media within the jacket, as shown in FIG. 4B. The individual layers can also incorporate additional engine features, such as inlet access ports to the Jacket micro-fluidic media and jacket outlet passages.

Closely spaced hexagons are one good approximation of a finite layer of porous media, though closely spaced squares, rectangles, arc sections, or other cross-sectional shapes can also be used. The location of the selected shapes are often offset between different layers to increase the tortuosity of the porous media, and in this manner a tradeoff can be made between heat transfer from the media to the cooling fluid and pressure drop of the cooling fluid within the porous media. By drafting these repeating shapes in the area constrained between the porous media's outside and inside diameter, and adding features to define other fluid passages, a design for a finite layer of the thruster can be created. The lithographic design 502 of these patterns dictates where material is to be removed from each metal layer. These enhancements can be applied throughout the jacket or just locally where additional fluid mixing is desired particularly in regions where the jacket fluid velocities are typically slow.

An alternative micro-fluidic design is one in which microtube bundles are produced for the porous media jacket. The microtube bundles are allowed to have a slow-twist about an axis that is roughly parallel to the axis of the engine such that the coolant is exposed to both the hot inside and cooler outside jacket walls as the fluid moves through the jacket (see e.g., the microtube bundles of FIG. 18). This design effectively enhances the thermal conductivity of the porous media matrix by enhancing heat transport through forced fluid convection between the inner and outer walls of the jacket. In other words, the microtube bundles provide a controlled flow of coolant between the inner and outer walls of the jacket, forcing the coolant to flow from the hot inner wall to the relatively cooler outer wall. Other structures can also be used, such as a twist ribbon structure (see e.g., the ribbon structures of FIG. 17), which can route coolant in a swirling motion through the porous media, resulting in controlled flow of coolant between the inner and outer walls of the jacket.

As the cuts required to approximate porous media are complex, it is advantageous to use a computer program for this design stage. When this process is repeated down the thrust axis of the thruster, the design for a three dimensional porous coolant channel is created within the resulting jacket.

Figure 12:
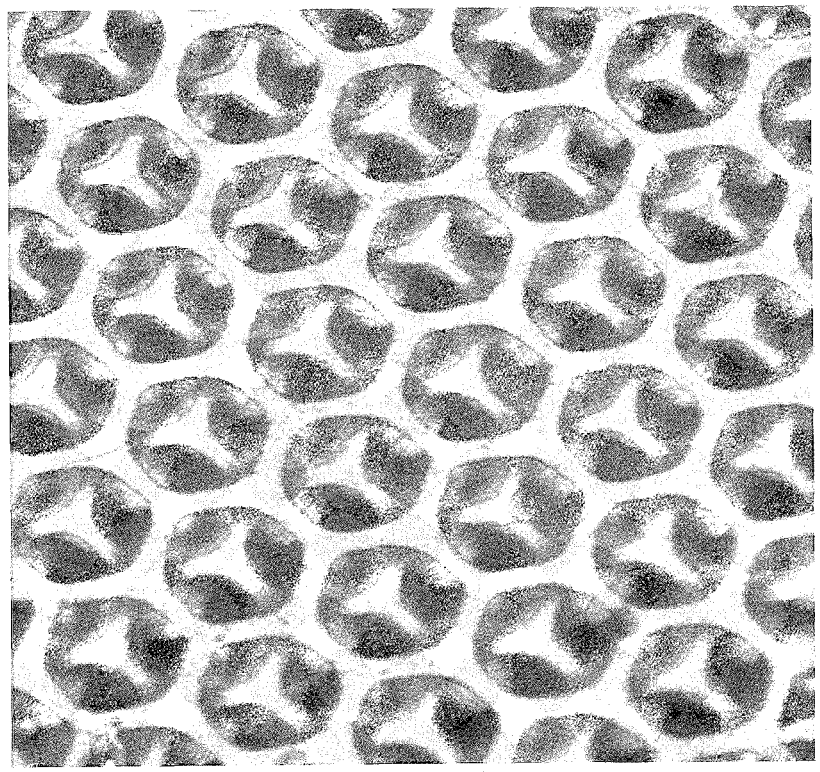
FIG. 12 shows a close up of an example structure of the porous media overlapping hexagonal structures made by a lithographic method.

The extent of overlap of the hexagons determines the tortuosity of the path of any fluid going through the matrix. This size of the individual hexagons and the overlap between layers is under the control of the designer, and thus materials can be made of the desired porosity or tortuosity. A close up of the overlapping grids is shown in FIG. 12. In one implementation, it has been found that a functional pore size for use with NOFB monopropellants is about $10/1000$ to $15/1000$ of an inch. The selection of desired pore size for specific systems depends upon the physical and thermal characteristics of the individual propellant and matrix material, as shown in Example 3.

As an initial operation, the lithographic design 502 is applied to metal components (e.g., foil layers). This application process may be accomplished by a number of methods. For example, masking and chemically etching metal foils provides a repeatable and reliable method to fabricate layers. This process can be started by transferring the design to a transparent material in order to create a lithographic mask. Next, an ultraviolet sensitive material is applied to the foil material that constitutes the individual layers of the thruster. When the mask is placed over the UV-sensitive material, applying UV light to the combination causes the UV-sensitive material to harden in specific areas to protect those areas from etching. That is to say, every area that the UV sensitive material does not receive UV light (i.e., those areas obscured by the mask) can be chemically removed, leaving only the foil areas that are covered with a hardened protective coating of UV-sensitive material.

An etching operation 504 removes the metal material that is not covered by the hardened UV-sensitive material. In one implementation, the etching is accomplished by placing the foils in a chemical bath. A separating operation 506 separates the etched metal foils from one another to yield individual foil layers (such as layer 508). A stacking operation 510 stacks the individual layers in an order that results in the porous media contour similar to that shown in FIGS. 3 and 4B. An example stack of layers is shown in as stack 512. An aligning operation 514 aligns the stacked layers to maintain precision flow paths, as shown in aligned stack 516. Alignments can be accomplished by datum planes, alignment pins, or some other suitable jig.

A bonding operation 518 bonds the individual layers to form a single block 520 from the many individual layers. Bonding can make use of an auxiliary joining agent; however, it may be advantageous to use diffusion bonding. One type of bonding that may be employed is termed "Laminated Foil Bonding," although other types of bonding may be used. Another type of bonding that may be employed is termed "Laminated Foil Strain-Limited Solid-State Diffusion Bonding." Diffusion bonding is a process by which excited atoms held in close proximity to one-another may jump the boundary between layers. When enough of these atoms make this transition, a bond is formed. Bonding of all layers forms the single block 520 from the many individual layers. The close proximity is created by pushing the layers together under load, and the atomic level excitation is created by heat. It should be noted that this is not melting the layers together. They simply diffuse into one another with the result of the single block 520 foamed from of the layers.

Bonding of layers may also be done in subunits (in which multiple layers constitute one subunit). An individual subunit may be bonded (e.g., using laminated strain-limited solid-state diffusion bonding), and then multiple subunits may be subsequently bonded together to form the entire jacket structure. In some embodiments, the layers are bonded in subunits of approximately one-fifth to one tenth of the total layers, and then the five to ten subunits are bonded together. The method of building and then bonding subunits may diminish the possibility of distortion caused by bonding individual layers over a complete jacket structure.

As an example, the thruster tested in the experiments below is approximately 2 inches long. A thruster of this size may be made of 3,000 to 5,000 individual layers of lithographic sheets. As engine size is increased, the thickness of individual layers may be kept approximately the same, or may also be increased in a linear or less than linear manner.

In addition, bonding may be performed by a method known as "strain bonding". In this method, the layers are aligned and placed between two inflexible ceramic panels. When heat is applied to this sandwich structure, the metal of the lithographic layers heats to cause the adjacent layers forming bonds.

Following bonding operation 518, a machining operation 522 machines the single block 520 to its final dimensions, yielding a regeneratively cooled porous media jacket 524. In one implementation, because the bonding process requires alignment and uniform pressure, it is not practical to fabricate the thruster with final dimensions pre etched, although other implementations may allow pre-etching. The block 520, containing the contoured porous media internal to the structure, is machined to final dimensions. A number of methods can be used to perform the machining, but traditional metal fabrication methods (i.e. milling, lathing, grinding, and drilling) are generally acceptable. The final jacket 524 can then receive any auxiliary hardware required to operate/measure the thruster (i.e. inlet ports, measurement ports, an injector head, a pressure cap, ignition mechanisms, and auxiliary hardware for mechanical interface or measurements).

In summary, FIG. 5 demonstrates a process for creating a regeneratively cooled porous media jacket from a stacked and bonded structure. The process is initiated by applying patterned designs to individual layers of metal components. The application process may include, without limitation, chemical etching, laser cutting, machining (CNC or manual), punching, sheering, electrical discharge machining (EDM), water jet cutting, plasma cutting, or any combination thereof, although chemical etching has been found particularly well suited to fabricate quantities of thin foils with very repeatable results. Individual layers are stacked in alignment and then bonded to form a block having a three dimensional fluid path in a channel between an impermeable inner wall and an impermeable outer wall. The interior and exterior profiles of the block are machined to yield the regeneratively cooled porous media jacket in final dimensions. The machining operation can employ conventional machining (CNC or manual), EDM, grinding, or any combination thereof. The completed jacket can receive inlet ports, measurement ports, an injector heads, a pressure cap, ignition mechanisms and auxiliary hardware for mechanical interface or measurements.

Example 2

Machined Metal Foams

Figure 6:
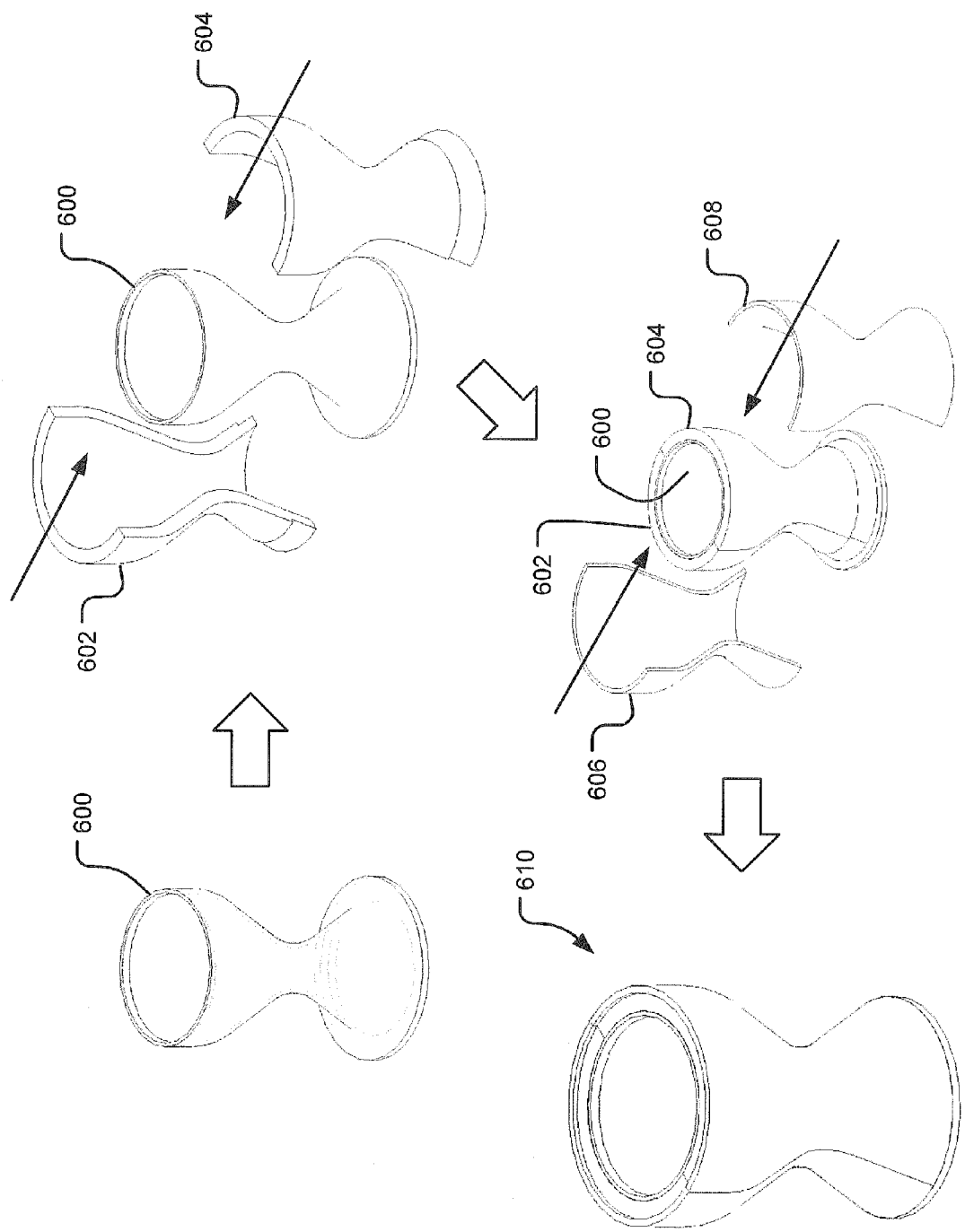
FIG. 6 illustrates a method of making an example regeneratively cooled porous media jacket using metal foam parts.

An alternative method of manufacturing a regeneratively cooled porous media jacket, involving machining and assembly, is described with regard to FIG. 6. The method of manufacturing relies on more traditional mechanical design and fabrication methods. The unassembled jacket is initially in the form of individual components: an inner wall 600 (which defines the combustion chamber), two halves of porous media 602, and 604, and two halves of outer wall 606 and 608. Candidate materials for the inner wall 600 include, without limitation, copper, aluminum, nickel, nickel alloys, stainless steel, niobium, rhenium, tantalum, molybdenum, carbon, carbon-carbon composite, or alloys/combinations thereof. Materials with higher thermal conductivity are advantageous for specific applications; however, chamber material is chosen for the intended combustion process. Not all materials can be fabricated with conventional machining, so a suitable process is employed. Candidate structures for the porous media halves 602 and 604 can include open celled metal foam, sintered porous media, sintered/diffusion bonded screens, or a combination thereof. Materials for the porous media halves 602 and 604 can include, without limitation, copper, aluminum, nickel, nickel alloys, stainless steel, niobium, rhenium, tantalum, molybdenum, or alloys thereof.

Forming the porous media halves 602 and 604 to the inner wall material can be accomplished by machining (manual or CNC), EDM, mandrel pressing, or a combination thereof. To achieve efficient cooling of the combustion chamber, effective thermal contact is maintained between the porous media 602, 604 and the inner wall 600. One method to achieve good thermal contact is the use of a braze or other high temperature wicking material. This approach provides a conductive heat path from the combustion chamber into the porous media. However, when use of braze is employed, care should be taken to avoid wicking material into the pores of the media 602, 604. If the pores of the media 602, 604 are occluded, the heat transfer in the media 602, 604 may be altered and the thruster may behave unpredictably. Further, the method of joining the porous media 602 604 to the inner wall 600 should result in a joint that will survive the extreme operating temperatures, be un-reactive with the coolant fluid, aid in heat transfer, and be resistant to thermal cycle degradation.

These components are drafted (usually in a solid modeling program) and fabricated individually. The materials choice defines the fabrication method. For traditional materials, standard machining techniques (i.e. milling, lathing, grinding, and drilling) are acceptable. However, if exotic materials are used, the fabrication method is adapted to the material. In one implementation, the inner wall 600 encompassing the combustion chamber is a single part, although multiple parts can be used for this component. The porous media halves 602 and 604 are assembled around the inner wall 600, and the outer wall halves 606 and 608 for a pressure shell around the porous media halves 602 and 604 and the inner wall 600. To accommodate the converging diverging nature of rocket thrusters, it has been found advantageous to split components in half in order to assemble them on a single inner wall 600, although other assembly configurations may be employed The porous media material influences the manufacturing method as well. If a porous media material displays sufficient strength to withstand machining tool pressure, standard machining techniques can be used. However, if the machining process alters pores, breaks bonds, or otherwise deforms the porous material, an alternate manufacturing process may be considered. Candidate porous materials include open celled metal foams (such as ERG Doucel®), sintered metal media, diffusion bonded screens (such as MKI Dynapore®), or a combination thereof. The inner wall and the outer wall should typically be designed to mate well with the porous media when choosing the material and manufacturing method. In most cases the porous media also provides structural integrity to the jacket walls that are under fluid pressure.

To achieve good heat transfer from the combustion chamber to the coolant fluid within the porous media channel, it is typically desirable to have good thermal contact between the combustion chamber and the porous media. Unless two parts are held together under pressure or have extremely smooth contact surfaces, a significant thermal contact resistance can exist. A contact resistance can hinder heat flow from one component to another. The contact resistance, however, can be reduced by filling the gaps with another conductive material. Furthermore, for the porous media channel to be load-bearing and help structurally support the walls, the porous media can be bonded to the walls. One effective method to achieve bonding between the porous media and the walls this is by brazing the porous media to the combustion chamber. The braze acts as a medium through which heat and mechanical load can be transferred. A braze between the combustion chamber and the porous media is an effective way to thermally and mechanically couple the porous media to the combustion chamber.

The outer wall halves 606 and 608 form a pressure shell to constrain the coolant flow through the porous media 602, 604 creating a seal around the thruster. The parts are assembled to be capable of handling the expected pressures and temperatures without allowing coolant fluid to leak through the outer wall 606, 608. The material choice and the bonding method will depend on the thermal design of the thruster (e.g., welding has been identified as a particularly well-suited bonding technique).

The outer wall 606, 608 is illustrated as two half components in FIG. 6. However, depending on geometry, it may be possible to slide as a single shell over the porous media. Whatever geometry is chosen, the pressure shell forms a fluid tight seal on the outside of the regenerative coolant media. Welding this interface may be advantageous due to fact that a welded seal does not degrade at elevated temperatures. The weld joins both outer wall halves 606 and 608 to the porous media halves 602 and 604 and joins the two outer wall halves 606 and 608 to each other along joints 180 degrees from each other to form a jacket 610. The jacket 610 can then receive any auxiliary hardware required to operate/measure the thruster (i.e. inlet ports, measurement ports, an injector head, a pressure cap, ignition mechanisms, and auxiliary hardware for mechanical interface or measurements).

Regeneratively cooled rocket engines have been tested using stainless steel, nickel, copper, and aluminum materials. Materials may be chosen based on their temperature characteristics as well as their non-activity with a particular propellant to be used. In some cases, it may be possible to modify the metal surface to avoid catalytic activity, while retaining the heat transferring property of the metal.

Figure 7:
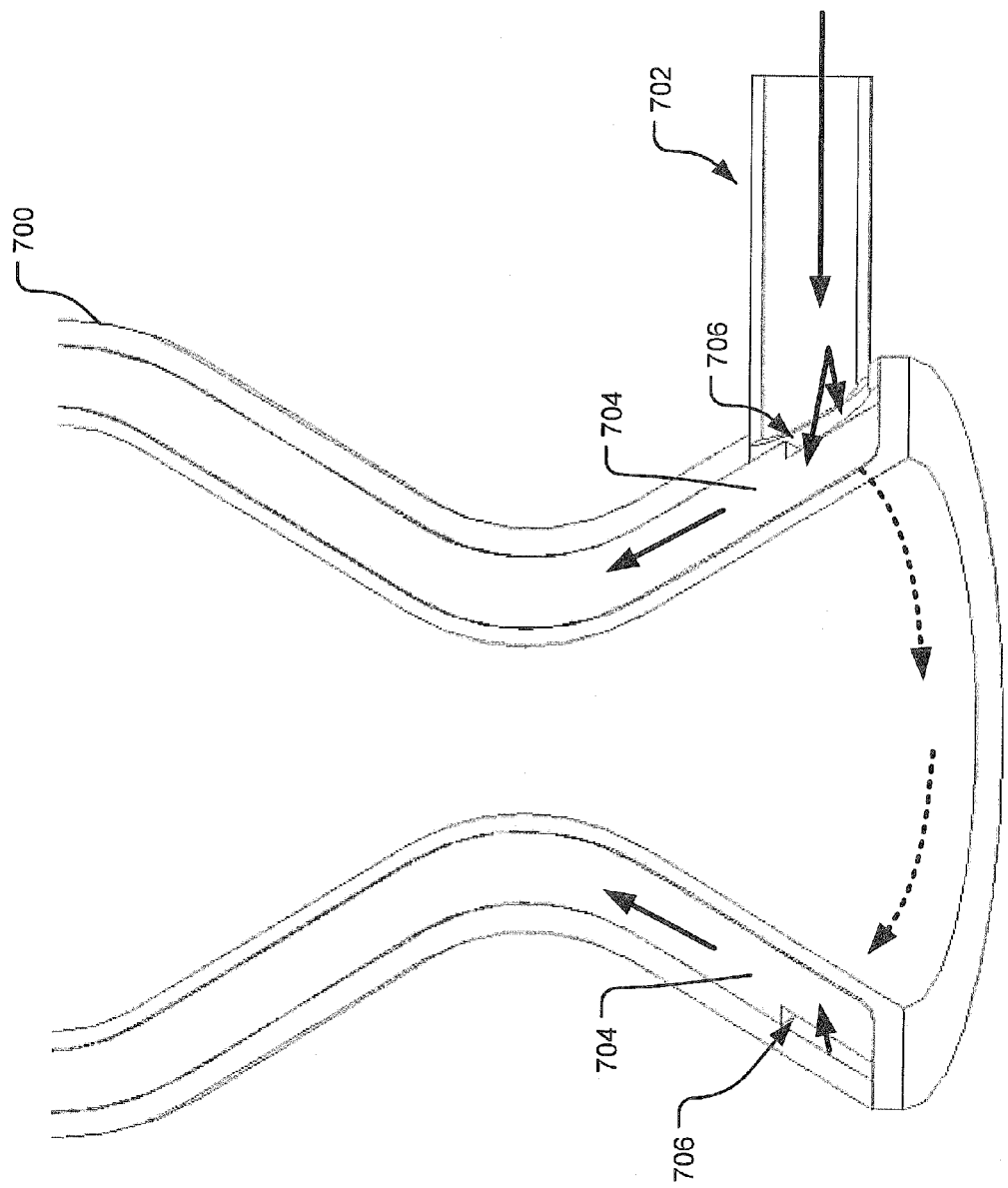
FIG. 7 illustrates an example implementation of an inlet manifold of a regeneratively cooled porous media jacket.

FIG. 7 demonstrates radial injection into a porous media regenerative coolant path (e.g., a channel) within a regeneratively cooled porous media jacket 700. In this implementation, the coolant fluid (all or part of the rocket combustion reactants) enters through an inlet tube 702. The inlet tube 702 flows coolant fluid circumferentially about the base of the jacket 700 in an annular void 706 constrained on the outside by the pressure shell of the jacket 700 and on the inside by the porous media 704. The coolant fluid also travels radially inward through the porous media 704 into the regenerative coolant path up the inside of the jacket 700 toward the injection head (not shown, but located at the top of the jacket 700 in the perspective shown in FIG. 7). The annular void 706 can either be created by extending the boundary of the pressure shell outward, or removing material from the porous media (as shown in FIG. 7). Radial injection is suitable in cases where the porous media is uniform and has voids in the axial direction similar to voids in the radial direction. However, if voids are an-isotropic, radial injection can complicate designs or may not be possible at all.

Figure 8:
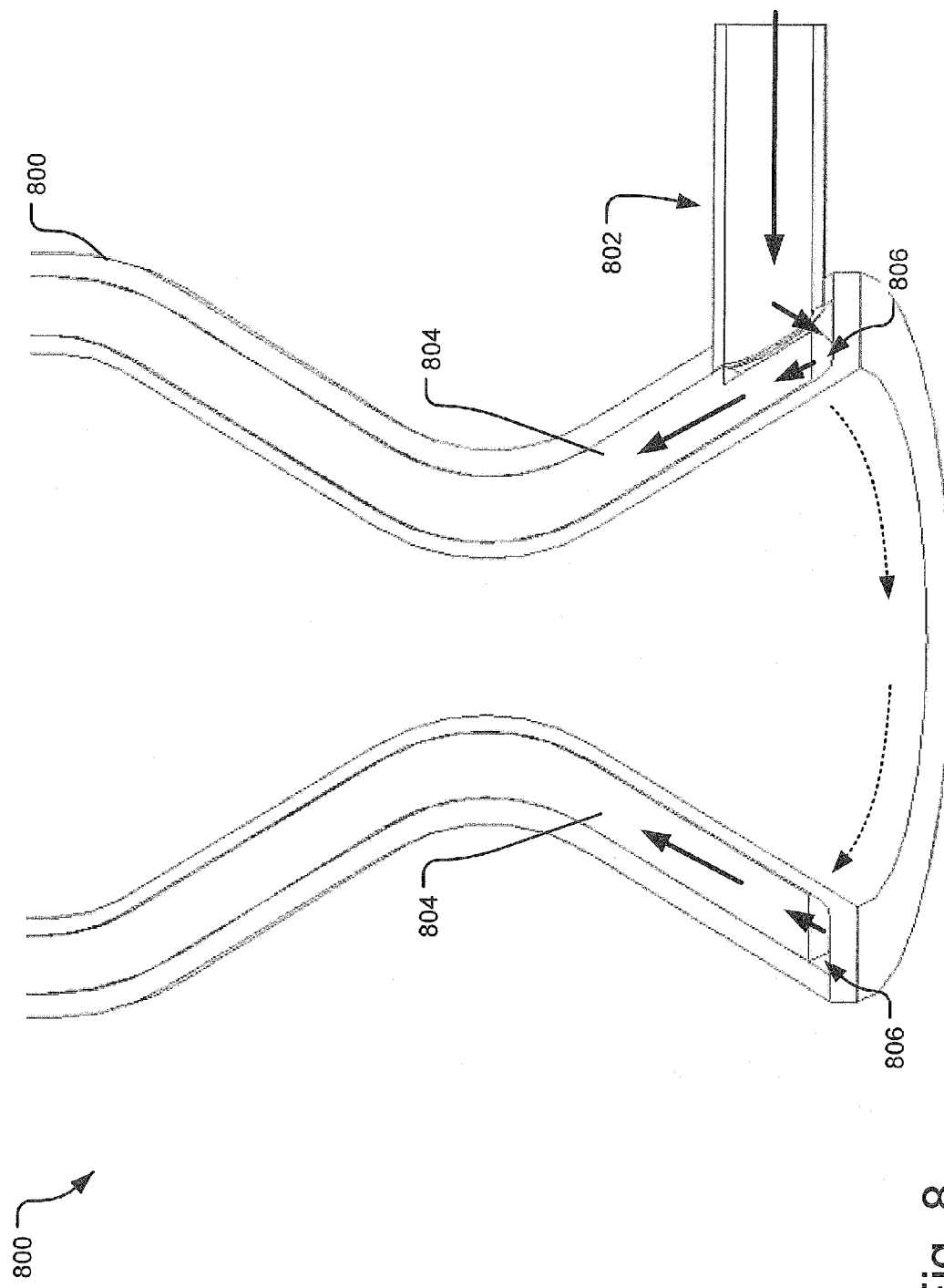
FIG. 8 illustrates another example implementation of an inlet manifold of a regeneratively cooled porous media jacket.

FIG. 8 demonstrates axial injection into a porous media regenerative coolant path (e.g., a channel) within a regeneratively cooled porous media jacket 800. In this implementation, the coolant fluid (all or part of the rocket combustion reactants) enter through an inlet tube 802. The inlet tube 802 flows current circumferentially about the base of the jacket 800 in an annular void 806 constrained on the bottom by the combustion chamber, on the inside by the combustion chamber (inner wall), on the outside by the outer wall, and top by the porous media 804. In the case of a stacked layer construction, the annular void is constrained on all sides by the stacked layers that constitute the aforementioned components. The coolant also travels axially upward through the regenerative coolant path up the inside of the jacket 800 toward the injection head (not shown, but located at the top of the jacket 800 in the perspective shown in FIG. 8). This method of injection is advantageous in cases where porous voids are concentrated in the axial direction. Such cases include the stacked layer method of construction where it can be much easier to fabricate inter-connected voids in the direction of stacking than in the radial direction.

Figure 9:
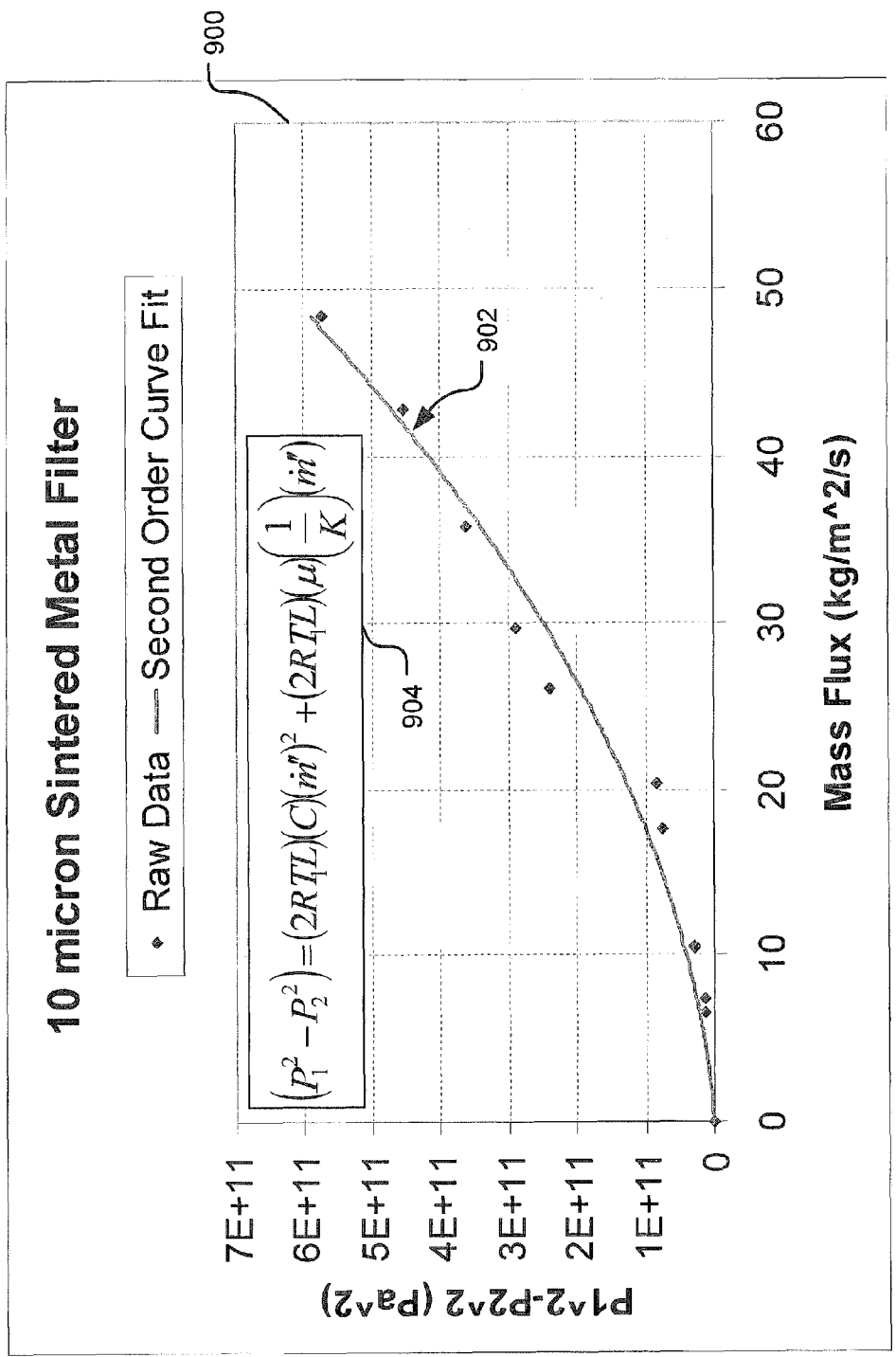
FIG. 9 illustrates a graph demonstrating pressure drop data through a porous media regeneratively cooled jacket.

FIG. 9 illustrates a graph 900 demonstrating pressure drop data through a porous media element. Porous media flow is defined to provide sufficient cooling to a rocket thruster while allowing sufficient propellant flow for the combustion process. To simplify characterizing a porous media, it is generally advantageous to have a constant cross section through the thickness of the element. That is to say, a homogeneous porous media with constant dimensions is desirable. Said porous element should be fixtured and instrumented such that mass flow, upstream pressure, and downstream pressure can be measured. If compressible fluids are used for the combustion process (i.e. gases or two phase fluids), pressure drop can more accurately be explained by plotting the mass flow of the fluid against the difference in squares of the pressures. To develop the graph 900, data is collected for three parameters (e.g., mass flow, inlet pressure, or outlet pressure). A quadratic curve 902 can be fit to the collected data, and linear and quadratic coefficients of the quadratic regression are generated. Knowledge of the test element dimensions and the test fluid properties allows one to extract flow coefficients. Equation 904 relates the quadratic coefficients to permeability and flow coefficients associated with Darcy flow. The parameters in equation 904 are consistent with Example 3: P1—Inlet pressure, P2—Outlet pressure, R—Gas constant, T1—Test temperature, L—Length of porous path (thickness of porous element), C—Form coefficient, $\dot{m}''$—Mass flux (mass flow/flow area), μ—Dynamic viscosity, K—Penneability coefficient. The form and permeability coefficients are used in subsequent analysis outlined in Example 3.

Example 3

Model for Design of Regeneratively Cooled Jackets

Disclosed herein is a system level analytical fluids model of incorporating porous media into a regeneratively cooled rocket combustion chamber jacket for purposes of illustrating the capability of porous media in this type of application for allowing a rocket thruster to operate on gas phase propellants. In this example, the specific problem of design of a typically worst case (in terms of ability to cool and jacket pressure drop) gas-phase NOFB monopropellant rocket engine is addressed, although different types of engines may be address based on these teachings. More details on NOFB monopropellants can be found in the already-incorporated U.S. patent application Ser. No. 12/268,266.

Heat transport into regeneratively cooled combustion chambers is commonly limited by the thermal conductivity of the fluid. This in turn limits the cooling capacity of fluids to cool combustion chamber walls. In a worst case scenario, the gas phase has such a low thermal conductivity compared to liquids that hot spots readily form where phase transitions from liquid to gas exist (i.e. boiling occurs). This process can be self-feeding since more boiling will naturally occur in the vicinity of small hot spots that have started from small seed regions, and these hot spot regions will naturally increase in size. In many cases, the growing hot spot regions can lead to thermal failure and loss of structural integrity of the materials.

Variable and Parameter Definitions

⟨T⟩=Volume-averaged porous media temperature
$T_{jo}$=Jacket outside wall temperature
$T_j$=Porous matrix jacket node temperature
$T_{ji}$=Jacket inside wall temperature
$T_{cw}$=Chamber wall temperature,
$T_{ce}$=Chamber freestream gas temperature,
$T_{aw}$=Chamber adiabatic wall temperature
$q''_{cw}$=Heat flux into Chamber wall
$q''_{ji}$=Heat flux into Jacket inner wall
p=Jacket propellant (fluid) pressure
$P_j'$=Jacket pressure gradient (along an isobaric line)
$\rho_f$=Jacket propellant (fluid) density ṁ=Jacket propellant (fluid) mass flow rate
ṁ"=Jacket propellant mass flux (Darcy)
$u_j$=Coolant jacket porous media fluid velocity (Darcy)
$u_{ce}$=Chamber-side freestream velocity
$\mu_f$=Fluid viscosity
$\mu_e$=Effective porous matrix fluid viscosity
$\mu_{cbl}$=Combustion boundary layer average gas viscosity
$c_{p,f}$=Fluid specific heat
$c_{p,j}$=Inter-jacket node fluid specific heat
$c_{p,cbl}$=Average combustion boundary layer specific heat
$k_f$=Thermal conductivity for jacket fluid
$k_{liner}$=Thermal conductivity for chamber liner
$k_s$=Thermal conductivity for porous matrix structure
$k_e$=Effective thermal conductivity for fluid-filled porous matrix
$R_{liner}$=Heat flux effective thermal resistances for the chamber liner
$R_{cbl}$=Heat flux effective thermal resistance for the combustion gas boundary layer
ε=Jacket porosity
K=Jacket permeability
C=Form coefficient
D—Experimental heat flow augmentation parameter for fluid tortuosity
G=Experimental heat flow augmentation parameter for solid matrix tortuosity
$t_j$=Local jacket fluid gap
$t_{liner}$=Local chamber wall thickness
$r_j$—Radius to center of jacket
$r_{ji}$=Radius to edge of jacket inner wall
$r_c$=Radius to chamber inner wall A theoretical model development, a method for evaluation of porous media fluid properties, and exemplary analysis of a worst case gas phase NOFB monopropellant rocket engine are described below.

Porous-Media-Jacket Fluids Model

Figure 10:
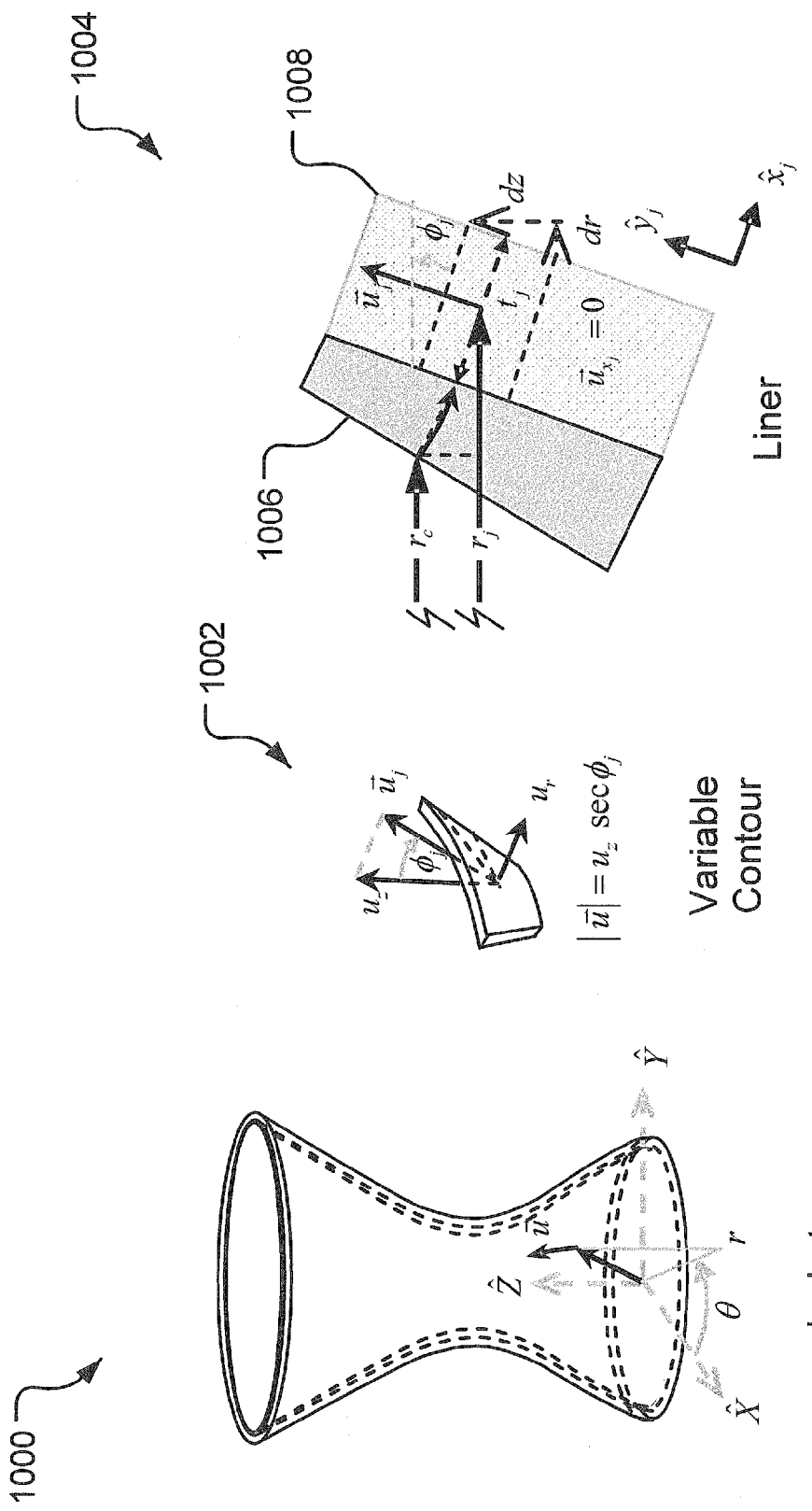
FIG. 10 illustrates porous media jacket fluid geometry configured for an example rocket combustion chamber.

An example porous media-jacket fluid geometry configured for a rocket combustion chamber is illustrated in FIG. 10. A geometric definition 1000 of the jacket defines some of the parameters listed above. A geometric definition 1002 defines several parameters associated with a portion of the jacket surface, labeled as a variable contour of the jacket. A geometric definition 1004 defines several parameters associated with the liner 1006 (i.e., the inner wall) and the porous media 1008 of the jacket.

Porous-continuum flow is defined as a fluid regime wherein the mean pore and solid obstacle dimensions are much smaller than the dimensions of the control volume through which the transport processes take place. The constitutive equations for fluid flow in this regime are applied to volume averaged continuum properties. The energy, momentum, and mass balance equations for incompressible fluid flow (e.g. Mach number <0.3 for gases) through a rigid, isotropic, and homogeneous porous medium are respectively:

$$\left[\varepsilon(\rho c_p)_f + (1-\varepsilon)(\rho c_p)_s\right]\frac{\partial \langle T \rangle}{\partial t} + (\rho c_p)_f \langle \vec{u} \rangle \cdot \vec{\nabla}\langle T \rangle = k_e \nabla^2 \langle T \rangle \quad (1)$$

$$\vec{\nabla}\langle p \rangle = \left[\mu_e \nabla^2 - \frac{\rho_f}{\varepsilon}\left(\frac{\partial}{\partial t} + \frac{1}{\varepsilon}\langle \vec{u} \rangle \cdot \vec{\nabla}\right) - \frac{\mu_f}{K} - \rho_f C|\langle \vec{u} \rangle|\right]\langle \vec{u} \rangle \quad (2)$$

$$\vec{\nabla} \cdot \langle \vec{u} \rangle = 0 \quad (3)$$

where $\langle\,\rangle$ indicates properties averaged over a volume larger than the mean free path of the molecules and large enough to represent the average bulk properties of the structural porous media matrix; $\langle \vec{u} \rangle$ is the Darcy velocity averaged over an entire porous volume element (not fluid velocity in pores); f, s, e subscripts denote fluid, solid, and effective properties respectively; and K and C represent the permeability and form coefficient of the medium respectively. Note Eq. 3 assumes the density of the fluid in the pore space changes relatively slowly as it moves axially through the jacket. This is a reasonable approximation, given the relative shallow local temperature gradients and pressure gradients parallel to the velocity vector that would cause corresponding changes in fluid density particularly with a well-designed (low pressure drop) jacket.

The effective thermal conductivity parallel and transverse to the flow can be represented by:

$$k_e = \varepsilon k_f + (1-\varepsilon)k_s + (k_f - k_s)G \quad (4)$$

$$k_e^T = \varepsilon k_f + (1-\varepsilon)k_s + (k_f - k_s)G + k_f PeD \quad (5)$$

where G denotes an experimental parameter based on the influence of the solid matrix on heat flow based on matrix tortuosity; Pe is the Peclet number; and D is an experimental parameter used for characterizing the influence of fluid tortuosity on augmenting fluid heat transfer. Because turbulence augments the transverse component of thermal conductivity, Eq. (4) can conservatively be used for calculating heat transfer into the porous matrix.

In general G is not a scalar, but rather a tensor, since it has non-isotropic variation in the porous-continuum associated with the non-isotropic variation in the effective thermal conductivity:

$$\tilde{G} = \frac{1}{(1-\sigma^2)}\left[\frac{\tilde{K}_e}{k_f} - (\varepsilon + (1-\varepsilon)\sigma)\tilde{I}\right] \quad (6)$$

where σ is the ratio of solid to fluid thermal conductivity. However, for gases, $\tilde{G}$ approaches 0. In this scenario, Eq. (4) effectively reduces to:

$$k_e = \varepsilon k_f + (1-\varepsilon)k_s \quad (7)$$

For steady-state flow, Eqs. (1) and (2) reduce to:

$$(\rho c_p)_f \langle \vec{u} \rangle \cdot \vec{\nabla}\langle T \rangle = k_e \nabla^2 \langle T \rangle \quad (8)$$

$$\vec{\nabla}\langle p \rangle = \left[\mu_e \nabla^2 - \frac{\rho_f}{\varepsilon^2}\langle \vec{u} \rangle \cdot \vec{\nabla} - \frac{\mu_f}{K} - \rho_f C|\langle \vec{u} \rangle|\right]\langle \vec{u} \rangle \quad (9)$$

Based on the axisymmetric geometry shown in FIG. 10 with no azimuthal flow introduced, there can be no fluid flow normal to the chamber liner walls or in an azimuthal direction. Furthermore, from Eq. (9), the isobars are normal to the fluid velocity streamlines that are parallel to the chamber walls. As such, the average Darcy velocity and pressure gradient reduces to:

$$\langle \vec{u} \rangle = \vec{u}_j = u_j(\sin\phi_j \hat{r} + \cos\phi_j \hat{z}) \quad (10)$$

$$\frac{\partial p}{\partial y_j}\hat{y}_j = \left[\mu_e \nabla^2 - \frac{\rho_f}{\varepsilon^2}\left(\vec{u}_j \cdot \hat{y}_j \frac{\partial}{\partial y_j}\right) - \frac{\mu_f}{K} - \rho_f C u_j\right]\vec{u}_j \quad (11)$$

Continuity adds the additional constraint:

$$\vec{\nabla} \cdot \langle \vec{u} \rangle = \vec{\nabla} \cdot \vec{u}_j = \sin\phi_j \frac{\partial u_j}{\partial r} + \sin\phi_j \frac{u_j}{r} + \cos\phi_j \frac{\partial u_j}{\partial z} = 0 \quad (12a)$$

Recognizing:

$$\frac{\partial}{\partial r} = \cos\phi_j \frac{\partial}{\partial x_j} + \sin\phi_j \frac{\partial}{\partial y_j}, \quad (12b)$$

$$\frac{\partial}{\partial z} = -\sin\phi_j \frac{\partial}{\partial x_j} + \cos\phi_j \frac{\partial}{\partial y_j}$$

$$\vec{\nabla} \cdot \langle \vec{u} \rangle = \frac{\partial u_j}{\partial y_j} + \sin\phi_j \frac{u_j}{r} = 0$$

$$\frac{\partial u_j}{\partial y_j} = -\sin\phi_j \frac{u_j}{r} \quad (12c)$$

Substituting Eq. (10) into Eq. (11):

$$\frac{\partial p}{\partial y_j} \hat{y}_j = \left[ \mu_e \nabla^2 - \frac{\mu_f}{K} - \rho_f C u_j \right] \vec{u}_j - \quad (13)$$

$$\frac{\rho_f}{\varepsilon^2} \left( \vec{u}_j \cdot \hat{y}_j \frac{\partial}{\partial y_j} \right) u_j (\sin\phi_j \hat{r} + \cos\phi_j \hat{z})$$

Assuming a slowly varying fluid channel relative to fluid and thermal gradients in the channel gap and substituting Eq. (12c) into Eq. (13):

$$\frac{\partial p}{\partial y_j} = \left[ \mu_e \nabla^2 - \frac{\mu_f}{K} + \left( \frac{\sin\phi_j}{\varepsilon^2 r} - C \right) \rho_f u_j \right] u_j = P'_j \big|_{y=const} = const \quad (14)$$

where Eq. (14) is constant across the cross-section as discussed above. Recognizing the fluid mass flux, $\dot{m}''=\rho_f u_j$ and that $C \approx 10^2\text{-}10^9$, Eq. 14 becomes:

$$C\dot{m}''^2 + \frac{\mu_f}{K} \dot{m}'' + \rho_f P'_j \big|_{y=const} = \mu_e \nabla^2 u_j \quad (15)$$

Note that in general, $\dot{m}''$ varies across the thin channel cross-section particularly due to the variations in fluid density and viscosity that will occur under the presence of a strong temperature gradient across the jacket.

Recognizing $$\frac{\partial^2}{\partial r^2} + \frac{1}{r}\frac{\partial}{\partial r} + \frac{\partial^2}{\partial z^2} = \frac{\partial^2}{\partial x_j^2} + \frac{\partial^2}{\partial y_j^2} + \frac{1}{r}\left( \cos\phi_j \frac{\partial}{\partial x_j} + \sin\phi_j \frac{\partial}{\partial y_j} \right),$$

then the viscous dissipation term on the right hand of Eq. (15) can be derived in terms of local jacket coordinates:

$$\mu_e \nabla^2 u_j = \mu_e \left( \frac{\partial^2 u_j}{\partial x_j^2} + \frac{\partial^2 u_j}{\partial y_j^2} + \frac{1}{r}\left( \cos\phi_j \frac{\partial u_j}{\partial x_j} + \sin\phi_j \frac{\partial u_j}{\partial y_j} \right) \right) \quad (16a)$$

-continued $$\mu_e \nabla^2 u_j = \mu_e \left( \frac{\partial^2 u_j}{\partial x_j^2} + \frac{\cos\phi_j}{r}\frac{\partial u_j}{\partial x_j} \right) \quad (16b)$$

Deriving the viscous dissipation term in terms of jacket mass flux:

$$\frac{\partial \dot{m}''}{\partial x_j} = \frac{\partial \rho_f u_j}{\partial x_j} = \rho_f \frac{\partial u_j}{\partial x_j} + \frac{\dot{m}''}{\rho_f} \frac{\partial \rho_f}{\partial x_j} \quad (17)$$

$$\frac{\partial u_j}{\partial x_j} = \frac{1}{\rho_f} \frac{\partial \dot{m}''}{\partial x_j} - \frac{\dot{m}''}{\rho_f^2} \frac{\partial \rho_f}{\partial x_j} \quad (18)$$

$$\frac{\partial^2 u_j}{\partial x_j^2} = \frac{1}{\rho_f} \frac{\partial^2 \dot{m}''}{\partial x_j^2} - \frac{2}{\rho_f^2} \frac{\partial \rho_f}{\partial x_j} \frac{\partial \dot{m}''}{\partial x_j} - \frac{\dot{m}''}{\rho_f^2} \frac{\partial^2 \rho_f}{\partial x_j^2} + \frac{2\dot{m}''}{\rho_f^3} \left( \frac{\partial \rho_f}{\partial x_j} \right)^2 \quad (19)$$

$$\nabla^2 u_j = \frac{1}{\rho_f} \frac{\partial^2 \dot{m}''}{\partial x_j^2} - \frac{2}{\rho_f^2} \frac{\partial \rho_f}{\partial x_j} \frac{\partial \dot{m}''}{\partial x_j} - \frac{\dot{m}''}{\rho_f^2} \frac{\partial^2 \rho_f}{\partial x_j^2} + \quad (20)$$

$$\frac{2\dot{m}''}{\rho_f^3} \left( \frac{\partial \rho_f}{\partial x_j} \right)^2 + \frac{\cos\phi_j}{r} \frac{1}{\rho_f} \frac{\partial \dot{m}''}{\partial x_j} - \frac{\cos\phi_j}{r} \frac{\dot{m}''}{\rho_f^2} \frac{\partial \rho_f}{\partial x_j} \frac{\partial \dot{m}''}{\partial x_j}$$

For typical values of K and $\mu_e \approx \mu_f$:

$$\frac{1}{K}\dot{m}'' \approx (10^9 - 10^{14}) \frac{\dot{m}}{r_j t_j} |\nabla^2 u_j| \sim \frac{\dot{m}}{r\rho_f t_j^3} + \frac{\dot{m}}{r^2 \rho_f t_j^2} \sim \frac{\dot{m}}{r\rho_f t_j^3} \quad (21)$$

$$\frac{\left( \frac{1}{K}\dot{m}'' \right)}{|\nabla^2 u_j|} \approx (10^9 - 10^{14}) \rho_f t_j^2 \quad (22)$$

Eq. (22) illustrates that $\mu_e \nabla^2 u_j$ can be neglected since the jacket gaps necessary for allowing this term to be significant are smaller than the pore spaces or even mean free path in the porous matrix in the first place. Eq. (15), therefore, becomes a quadratic in $\dot{m}''$ that can be solved for the positive root:

$$\dot{m}''(T) = \frac{\mu_f(T)}{2KC} \left[ \sqrt{1 - \frac{4CK^2 \rho_f(T) P'_j}{(u_f(T))^2}} - 1 \right] \quad (23)$$

Recognizing $r = x \cos\phi_j + r_j - t_j \cos\phi_j/2$, $dr = \cos\phi_j dx$, Eq. (23) is further constrained by the following overall continuity relationship:

$$\dot{m} = \int_{A_c} \dot{m}'' \cdot d\vec{A} = \quad (24)$$

$$\frac{2\pi}{\cos\phi_j} \int_{A_c} \dot{m}'' r \, dr = 2\pi \int_0^{t_j} \dot{m}''(x_j)(x_j \cos\phi_j + r_j - t_j \cos\phi_j/2) \, dx_j$$

Substituting Eq. (23) into Eq. (24) yields:

$$\dot{m} = \frac{\pi}{KC} \int_0^{t_j} \left( \mu_f(T) \left\{ \sqrt{1 - \frac{4CK^2 \rho_f(T) P'_j}{(u_f(T))^2}} - 1 \right\} \right) \quad (25)$$

$$(x_j \cos\phi_j + r_j - t_j \cos\phi_j/2) \, dx_j$$

To determine the temperature distribution across the channel, Eq. (8) can be expanded:

$$(\langle \vec{u} \rangle \cdot \vec{\nabla}) \langle T \rangle = \tag{26}$$

$$u_j\left(\sin\phi_j \frac{\partial}{\partial r} + \cos\phi_j \frac{\partial}{\partial z}\right)\langle T \rangle = \frac{k_e}{(\rho c_p)_f}\left(\frac{\partial^2}{\partial r^2} + \frac{1}{r}\frac{\partial}{\partial r} + \frac{\partial^2}{\partial z^2}\right)\langle T \rangle$$

Eq. (26) can be represented in local channel coordinates using the previously identified coordinate transformations:

$$\frac{\partial^2 \langle T \rangle}{\partial x_j^2} + \frac{\partial^2 \langle T \rangle}{\partial y_j^2} = \left(\alpha(x_j, y_j) - \frac{\sin\phi_j}{r}\right)\frac{\partial \langle T \rangle}{\partial y_j} - \frac{\cos\phi_j}{r}\frac{\partial \langle T \rangle}{\partial x_j} \tag{27a}$$

where $$\alpha(x_j, y_j) \equiv \frac{u_j(\rho c_p)_f}{k_e} = \frac{c_{p,f}\dot{m}''}{k_e} \tag{27b}$$

Ultimately, Eq. (27) may be solved with a 2D partial differential equation solver. For the rocket combustion chamber problem shown in FIG. 11, the spatial gradients in the x direction will dominate the temperature gradients in the y-direction in Eq. (27). A very reasonable approximation to this solution that allows one to use a 1D solver to incrementally step in the y-direction through the porous matrix is, therefore:

$$\frac{\partial \langle T \rangle}{\partial y_j} = \cos\phi_j \frac{\partial \langle T \rangle}{\partial z} = \left(\alpha(x_j, y_j) - \frac{\sin\phi_j}{r_j}\right)^{-1}\left(\frac{\partial^2 \langle T \rangle}{\partial x_j^2} + \frac{\cos\phi_j}{r_j}\frac{\partial \langle T \rangle}{\partial x_j}\right) \tag{28}$$

Note that the two boundary conditions apply at the jacket walls:

$$\left.\frac{\partial \langle T \rangle}{\partial y_j}\right|_{ji} = \frac{q''_{ji}}{k_e}, \tag{29}$$

$$\left.\frac{\partial \langle T \rangle}{\partial y_j}\right|_{jo} = 0 \text{ for worst case (hot) insulated casing}$$

Porous-Media-Jacket Heat Transfer Model

Figures 11A, 11B:
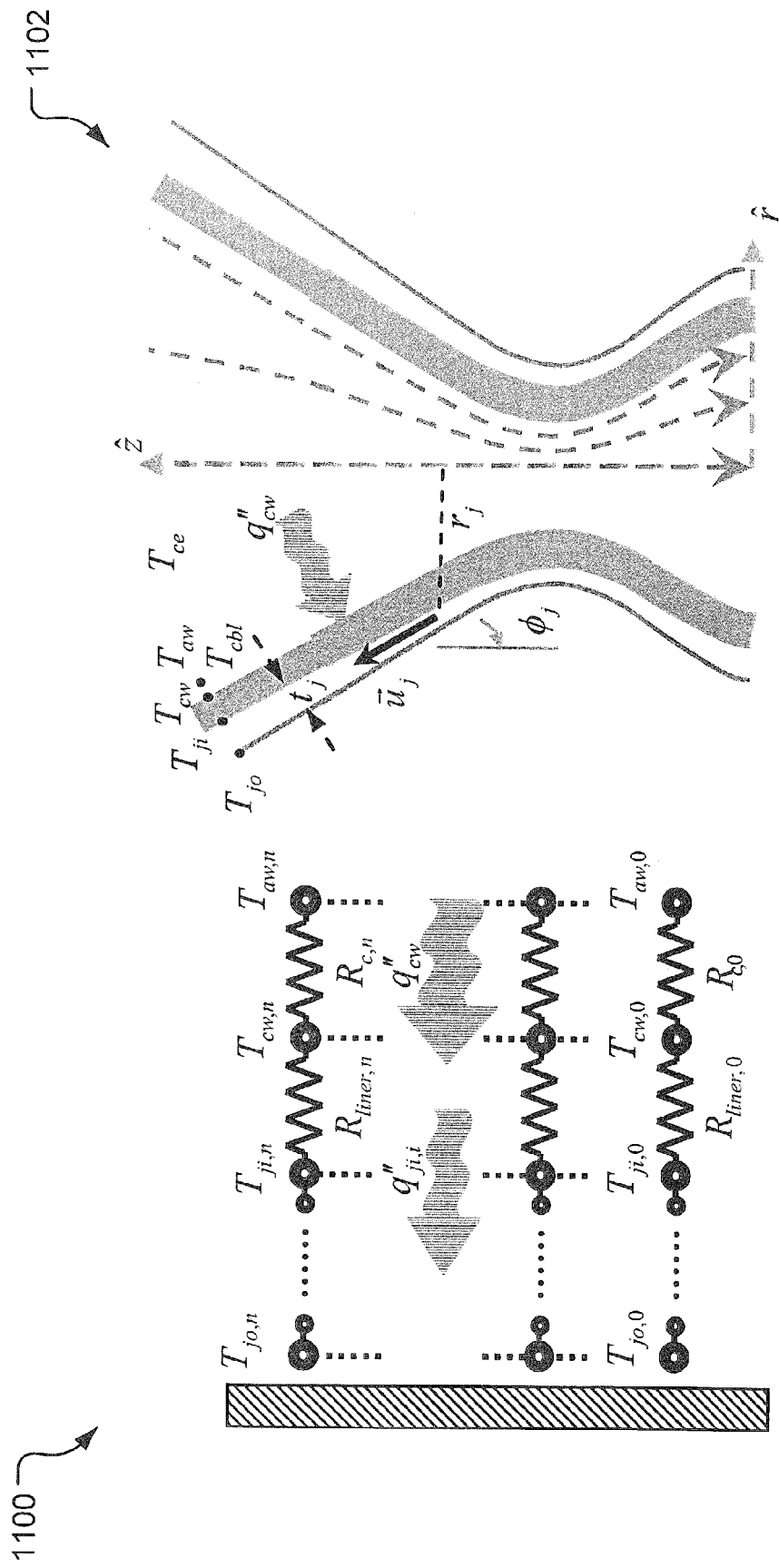
FIGS. 11A & 11B illustrate an example heat transfer model geometry and thermal node network.

The heat transfer model geometry for transfer of heat from a rocket combustion chamber into the porous media jacket with regenerative-cooling propellant is shown in FIGS. 11A & 11B, which illustrate an example heat transfer model geometry 1102 (FIG. 11B) and thermal node network 1100 (FIG. 11A), both of which define parameters listed above and their spatial locations as is applicable. The heat transfer model assumes, worst case, that there is a perfect insulating boundary condition on the outside jacket wall such that maximum possible coolant propellant temperatures are obtained. It should be noted that due to the finite wall thickness, particularly in the vicinity of the throat, an axial correction between a given jacket axial node and the corresponding chamber flux node is necessary as shown in FIG. 10. This correction is based on assuming a spline fit for the heat flow through the liner wall that is normal at both liner wall surfaces. Justification for this spline fit is described in more detail in the description on deriving the liner thermal resistance. Furthermore, the temperature distribution across the jacket involves a user specified number of inter-jacket nodes.

FIGS. 11A & 11B illustrates an example heat transfer model geometry 1102 (FIG. 11B) and thermal node network 1100 (FIG. 11A), both of which define parameters listed above.

Heat flux through the thermal network can be calculated from:

$$q''_{ji}(z) = \frac{(T_{aw} - T_{ji})}{(\eta_{q''}(R_{cbl} + R_{liner}))} \tag{30}$$

where $\eta_{q''} \equiv q''_{cw}/q''_{ji}$ and the adiabatic wall temperature, $T_{aw}$, is estimated from:

$$h(T_{aw}) - h(T_{ce}) = \int_{T_{ce}}^{T_{aw}} c_{p,c}\, dT = \frac{\eta_{cbl}}{2}u_{ce}^2 \tag{31}$$

where $\eta_{cbl} \approx Pr^{0.33}$. Nodal temperatures can subsequently be calculated:

$$T_{ji,i} = T_{cw,i} - R_{liner,i}\eta_{q''}q''_{ji,i}\ T_{cw,i} = T_{aw,i} - R_{cbl,i}\eta_{q''}q''_{ji,i} \tag{32}$$

The thermal resistance through the combustion chamber gas boundary layer (subscript cbl) can be estimated from the Bartz equation:

$$h_{cbl} = 0.009058(c_{p,cbl}\mu_{cbl}^{0.2})\frac{\dot{m}^{0.8}}{r_c^{1.8}} \tag{33}$$

$$R_{cbl}(T, z) = \frac{1}{h_{cbl}} = 110.4 \frac{r_c^{1.8}}{c_{p,cbl}\mu_{cbl}^{0.2}\dot{m}^{0.8}} \tag{34}$$

The chamber boundary layer properties are evaluated at the average temperature between the freestream temperature, $T_{ce}$, and the chamber wall temperature, $T_{cw}$ denoted as $T_{cbl}$. The chamber liner wall conductive thermal resistance is calculated from consideration of the variation in liner wall geometry and finite liner wall thickness particularly in the vicinity of the chamber throat. For steady-state conductive heat transfer:

$$\int_V \vec{\nabla} \cdot (k_{liner}\vec{\nabla}T_{liner})\, dV = k_{liner}\int_A \vec{\nabla}T_{liner} \cdot d\vec{A} = 0 \tag{35a}$$

$$k_{liner}\int_A \vec{\nabla}T_{liner} \cdot d\vec{A} \approx \tag{35b}$$

$$k_{liner}\frac{\partial^2 T}{\partial y^2}\pi(r_j - (t_j\cos\phi_j)/2 + r_c)t_{liner}dz/\cos((\phi_c + \phi_j)/2) +$$

$$k_{liner}\frac{\partial T}{\partial x}\bigg|_{wj} 2\pi(r_j - (t_j\cos\phi_j)/2)dz/\cos\phi_j - q''_{cw}2\pi r_c dz/\cos\phi_c$$

Assuming that the temperature gradient parallel to the jacket surface is negligible compared to heat flow normal to the jacket surface ($\partial T/\partial y \ll \partial T/\partial x$) (verification of this assumption should be made in post-model analysis):

$$\left.\frac{\partial T}{\partial x}\right|_{ji} = \frac{r_c q''_{cw}}{r_{ji}k_{liner}}\frac{\cos\phi_j}{\cos\phi_c} \tag{36}$$

Deriving the effective thermal resistance through the chamber liner wall requires knowledge of the temperature gradient through the chamber liner wall and the variation in cross-sectional area along this flow path. Given the large variation in heat flow cross-sectional area with radial as compared to axial changes inside the liner wall, a reasonable approximation for the heat flow thermal resistance can be made by averaging the liner surface normal angles, $\phi_{ave}=(\phi_c+\phi_f)/2$, and integrating along the resultant average straightline path (see FIG. 10).

Recognizing that along this path, $dx_{rz,liner}=-dz_{liner}/\sin\phi_{ave}$w and $dz_{liner}=-dr_{liner}\tan\phi_{ave}$w:

$$\left(\cos\phi_{ave}\frac{\partial T}{\partial r_{liner}}-\sin\phi_{ave}\frac{\partial T}{\partial z_{liner}}\right)= \quad (37)$$

$$2\cos\phi_{ave}\frac{\partial T}{\partial r_{liner}}\approx \frac{q''_{cw}}{k_{liner}}\frac{\cos\phi_{ave}}{\cos\phi_c}\frac{r_c}{r_{liner}}$$

Integrating Eq. (37) with respect to $r_{liner}$ along this path:

$$T_{cw}-T_{ji}\approx \frac{r_c}{2k_{liner}\cos\phi_c}\ln\left|\frac{2r_j-t_j\cos\phi_j}{2r_c}\right|q''_{cw} \quad (38)$$

From which the liner thermal resistance as defined in Eq. (31) can be derived:

$$R_{liner}\approx \frac{r_c}{2k_{liner}\cos\phi_c}\ln\left|\frac{2r_j-t_j\cos\phi_j}{2r_c}\right| \quad (39)$$

For steady state heat transfer:

$$\eta_{q''}\equiv q''_{cw}/q''_{ji}=\frac{\pi(2r_j-t_j\cos\phi_j)dz/\cos\phi_j}{2\pi r_c dz/\cos\phi_c}=\frac{r_{ji}\cos\phi_c}{r_c\cos\phi_j} \quad (40)$$

Characterizing Gas Pressure Drop Through Porous Media

For purposes of developing experimental measurements of a porous medium's Form (C) and Permeability (K) coefficients in experimental set-ups, for 1D steady-state gas flows through simple geometry (e.g. flat discs), a simpler form of Eq. (15) is desirable that takes into consideration the variation in gas fluid density for large pressure drops. Incorporating the ideal gas law, Eq. (15) can be integrated along a streamline that flows normal to a disc surface:

$$(P_1^2-P_2^2)=(2RTL)(C)(\dot{m}'')^2+(2RTL)(\mu_f)\left(\frac{1}{K}\right)(\dot{m}'') \quad (41)$$

Fitting this Eq. 41 to pressure drop data, best-fit Form (C) and Permeability (K) coefficients from published pressure drop data of various sintered porous media and metal foams (see Table 1) may be developed to incorporate into the fluids model described above. Note: % Dense=1−ϵ, * denotes Sintered Metal Filters, and ** denotes Metal Foams.

TABLE 1

Flow coefficients for various porous metal media
Flow Coefficient Comparison

| Media | % Dense | C (m^−1) | K (m^2) |
|---|---|---|---|
| 0.5 micron Filter* | 83% | 1.00E+09 | 5.00E−14 |
| 1 micron Filter* | 80% | 2.00E+08 | 1.50E−13 |
| 3 micron Filter* | 69% | 1.79E+07 | 5.50E−11 |
| 5 micron Filter* | 70% | 1.11E+07 | 8.00E−13 |
| 8 micron Filter* | 70% | 8.33E+06 | 1.20E−12 |
| 10 micron Filter* | 68% | 5.88E+06 | 1.80E−12 |
| 15 micron Filter* | 64% | 9.09E+05 | 4.00E−12 |
| 20 micron Filter* | 55% | 3.33E+05 | 1.00E−11 |
| 30 micron Filter* | 56% | 4.00E+05 | 1.70E−11 |
| 50 micron Filter* | 56% | 3.13E+05 | 2.50E−11 |
| 80 micron Filter* | 52% | 2.00E+05 | 4.00E−11 |
| 100 micron Filter* | 55% | 1.08E+05 | 6.50E−11 |
| 150 micron Filter* | 56% | 9.09E+04 | 1.50E−10 |
| 200 micron Filter* | 46% | 7.30E+04 | 2.58E−10 |
| 10 PPI Foam 8%** | 8% | 1.81E+02 | 3.43E−09 |
| 10 PPI Foam 23%** | 23% | 2.09E+03 | −1.06E−09 |
| 10 PPI Foam 37%** | 37% | 6.70E+03 | −5.64E−10 |
| 20 PPI Foam 8%** | 8% | 2.32E+02 | 1.52E−09 |
| 20 PPI Foam 23%** | 23% | 2.09E+03 | 2.41E−10 |
| 20 PPI Foam 37%** | 37% | 1.01E+04 | −3.94E−10 |
| 40 PPI Foam 8%** | 8% | 4.38E+02 | 2.00E−09 |
| 40 PPI Foam 23%** | 22% | 3.27E+03 | 1.30E−09 |
| 40 PPI Foam 35%** | 35% | 1.15E+04 | −2.68E−10 |

The metal foams and sintered metal filters are exemplary materials for purposes of illustrating the characterization process of the porous materials for this application. Additional porous media may be used in this application and similarly be characterized as above.

Example 4

Fluids and Engine Thermophysical Properties

The fluids and heat transport model from above has been applied to the problem of designing a worst case gas phase NOFB monopropellant rocket engine using uncombusted (jacket) and combusted (chamber) NOFB monopropellant gas mixture thermophysical and transport properties. In this model, these properties are recalculated along at each axial node point based on the temperature in the jacket and temperature in the chamber boundary layer. The boundary layer temperature for purposes of evaluating combustion-side fluid properties is assumed to be an average between the freestream temperature of the NOFB monopropellant and the combustion chamber wall. The chamber freestream gas velocity, $u_{ce}$, has been estimated by utilizing NASA's Chemical Equilibrium Analysis code (Gordon & McBride 1996) to evaluate the isentropic freestream fluid velocities in a nozzle relative to the throat.

FIG. 12 illustrates a magnified photo 1200 of the porous media overlapping hexagonal structures made by a lithographic manufacturing method. In some implementations, it is advantageous to offset foil features to alter micro fluidic passages. Photo 1200 demonstrates such a geometry wherein the top layer is offset from the layer below in order to induce turbulence in the fluid. Greater levels of turbulence, generally, aid in heat transfer between a solid and a convective fluid. It should be noted that the designer has a high level of control in the geometry of coolant passageways. This particular structure has been advantageous for our thruster; however, the choice in fluid passages should be tailored to the combustion process and the coolant fluid or fluids.

Example 5

Engine Design of an NOFB Gas Phase Thruster

The Porous-Media-Jacket-Fluids model described above is used for the conservative design of a gas-phase NOFB thruster. For a given mass flow rate, two-phase and liquid phase propellants typically exhibit lower pressure drop (due to the higher average fluid density) and lower jacket temperatures due to evaporative cooling of the liquid. Once a gas-phase design is complete, it can be instrumented and validation tested as well as run with two-phase and liquid propellants. In the design of a jacket, the temperature everywhere inside the jacket should remain below the temperature limits of the coolant being used. One exemplary high performance NOFB monopropellant has a thermal degradation limit of approximately 400° C. before it very rapidly decomposes.

In general, for a given rocket flow mass flux (mass per unit cross-sectional area), the heat flux from the combustion chamber scales weakly (gets slightly worse) with the increasing physical dimension of the engine, but is not a bad approximate scaling for evaluating how a jacket design may perform. To keep prototyping costs low particularly for the advanced micro-fluidic fabrication processes, scaled down engines can typically be developed and tested first prior to scaling up to larger scale engines. Testing of a regenerative jacket is relevant to determine the effectiveness of the jacket design and testing off-nominal scenarios from the original analysis. This experimental step is relevant for evaluating more complex flow-directing or flow steering geometries incorporated into the jacket as well as operating with two-phase flows. These scenarios are typically difficult to analyze during the design phase.

Engine testing is best conducted in its relevant environmental conditions. For deep space applications, engine testing should ultimately occur in a vacuum chamber capable of handling the rocket effluence at the rate the engine produces it. Prior to conducting this more expensive testing, preliminary testing to evaluate a jacket design under atmospheric conditions can be conducted. As soon as a rocket engine achieves supersonic velocities in the nozzle section downstream of the engine throat (typically achieved with a combustion chamber pressure that is approximately twice that of the local atmospheric pressure) any disturbances in the flow field downstream of the combustion chamber cannot propagate into the combustion chamber (the propagate at the local speed of sound in the gases). Therefore, evaluating jacket cooling upstream of the engine throat can be preliminarily tested under atmospheric conditions as long as the chamber pressure is maintained sufficiently high. Some provision typically needs to be made for flow separation from the supersonic nozzle if significant fractions of the supersonic nozzle are being regeneratively-cooled.

Figure 13B:
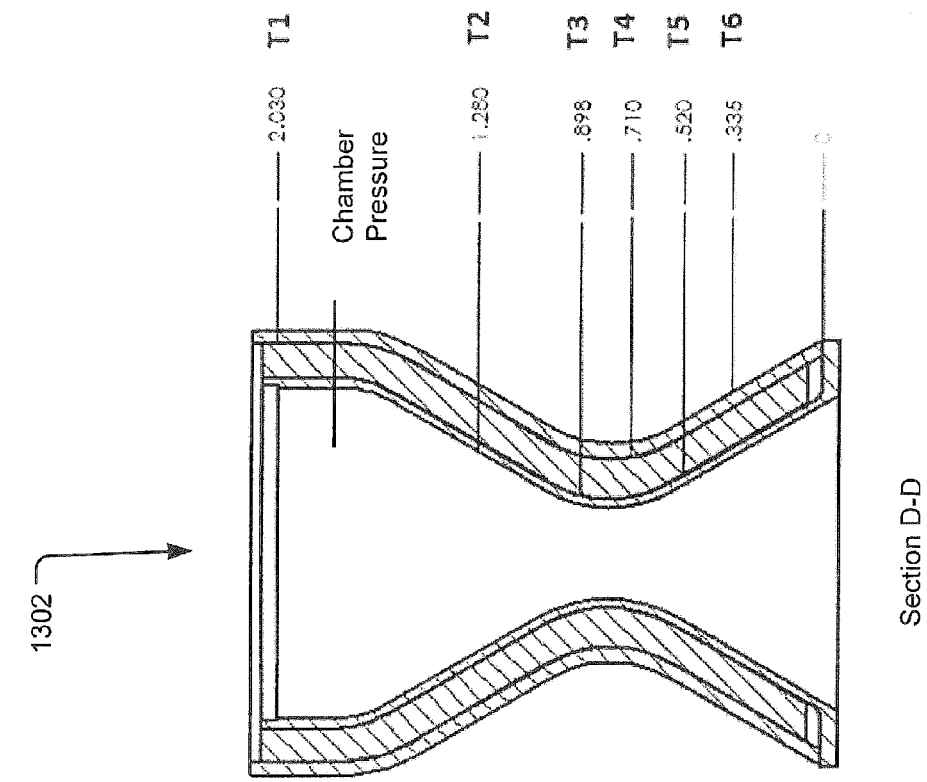
FIGS. 13A & 13B show example locations of thermocouples and combustion chamber pressure port located in a prototype rocket combustion chamber with a porous media jacket as discussed in Example 6.
Figure 13A:
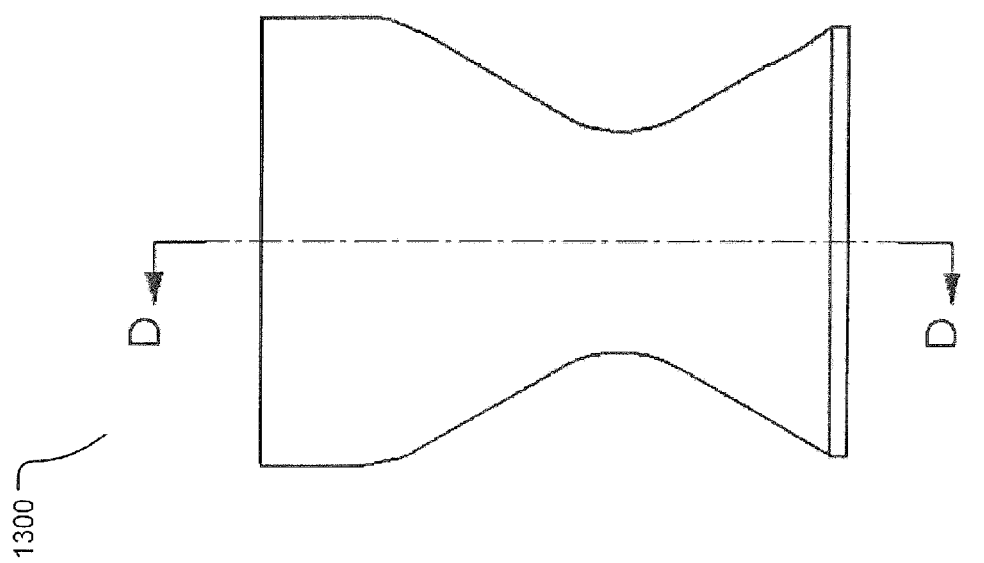

FIGS. 13A & 15B illustrates an exemplary 25 lbf thruster jacket design utilizing a single-pass, regeneratively-cooled porous media jacket and the design methodology described above with the 400° C. temperature limit in the jacket. In this jacket, both the combustion chamber pressure (relevant to estimating heat flux from combustion chamber) and temperature distributions on the inside and outside jacket wall are measured with a pressure transducer and miniature thermal couples as indicated in FIG. 13B. These are exemplary positions for sampling pressure and temperature. Alternative locations may also be used.

Thermocouples were placed at six positions in the engine 1300 as shown in FIG. 13B. Thermocouple T1 is at the injector head (not shown but generally located at 102), thermocouples T2-T3 are in the converging region of the engine 1300, T4 is at the throat, and T5 and T6 are in the diverging region of the engine. The entire tested engine 1300 is approximately 2 inches long (the numbers in FIG. 13B refer to the distance from the nozzle to the indicated thermocouple). The porous media in this example is 0.125" inches thick throughout the entire engine. The hexagonal pores are 0.015" across the flats (about ten micropores per width).

Example 6

Prototype Testing and Evaluation of an NOFB Gas Phase Thruster with Thermocouples and Pressure Port The instrumented thrust chamber shown in FIGS. 13A & 15B was integrated with the rest of the rocket engine components shown in FIG. 3 minus the 310 supersonic nozzle extension only for use in space vacuum conditions.

Figure 14:
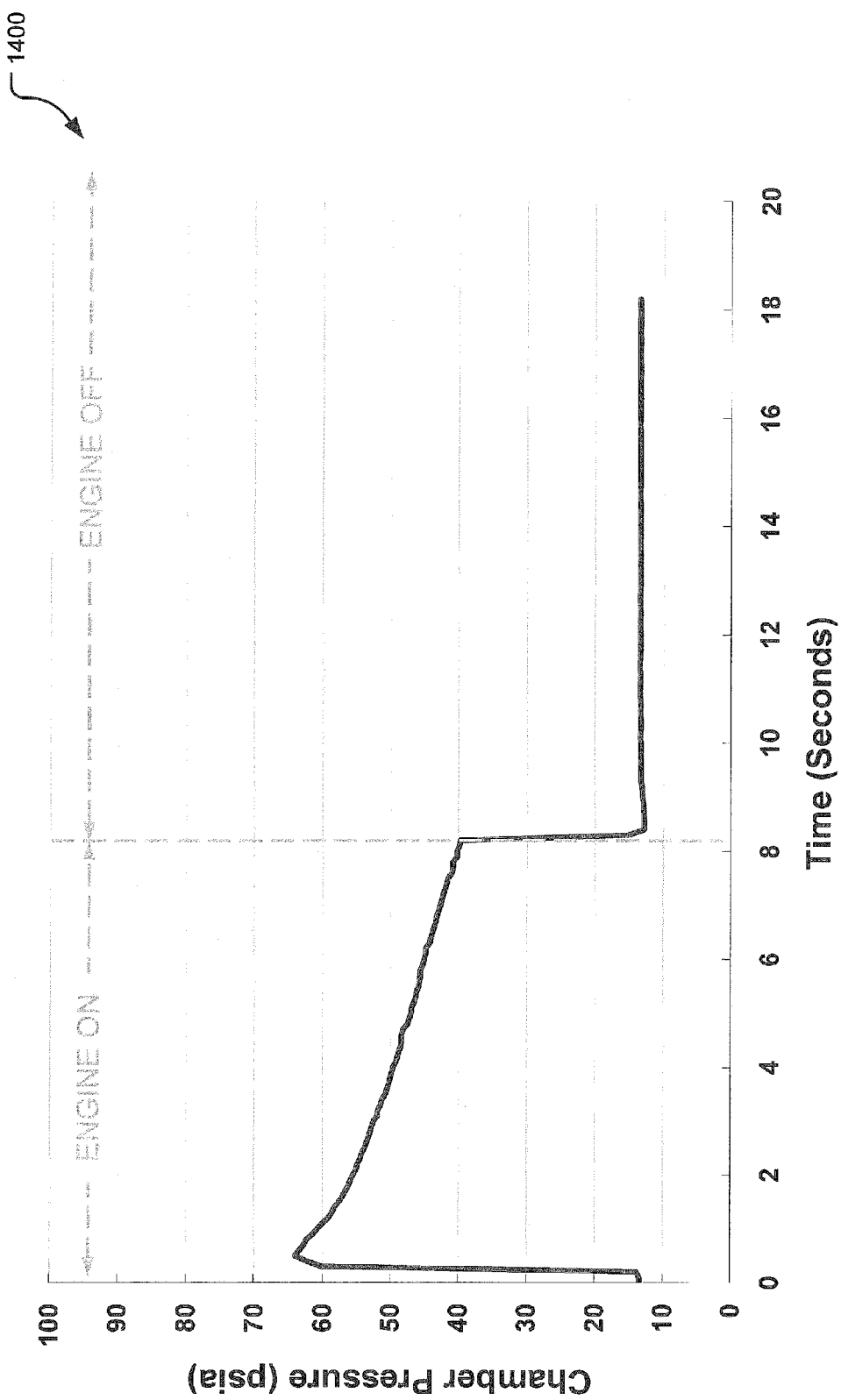
FIG. 14 shows an example combustion chamber pressure as a function of time from the exemplary prototype engine described in Example 6.

FIG. 14 illustrates the combustion chamber pressure profile chart 1400 for a porous regenerative cooled thruster measured from an exemplary run with the instrumented prototype engine. The engine is ignited at time 0 and shut down at 8 seconds. As the combustion chamber pressure decreases as a function of time due to decreasing pressure in the supply tank, the heat transport into the chamber wall also typically decreases. However, many systems would not demonstrate decaying combustion chamber pressure such as this. It is a side effect of the testing system. Chamber pressure provides a pressure gradient that ultimately generates thrust. The heat generated in this particular test created the temperature profiles shown in FIG. 15. This measurement is relevant for assessing the engine jacket thermal response under different engine operating pressures and resultant thrust levels.

Figure 15:
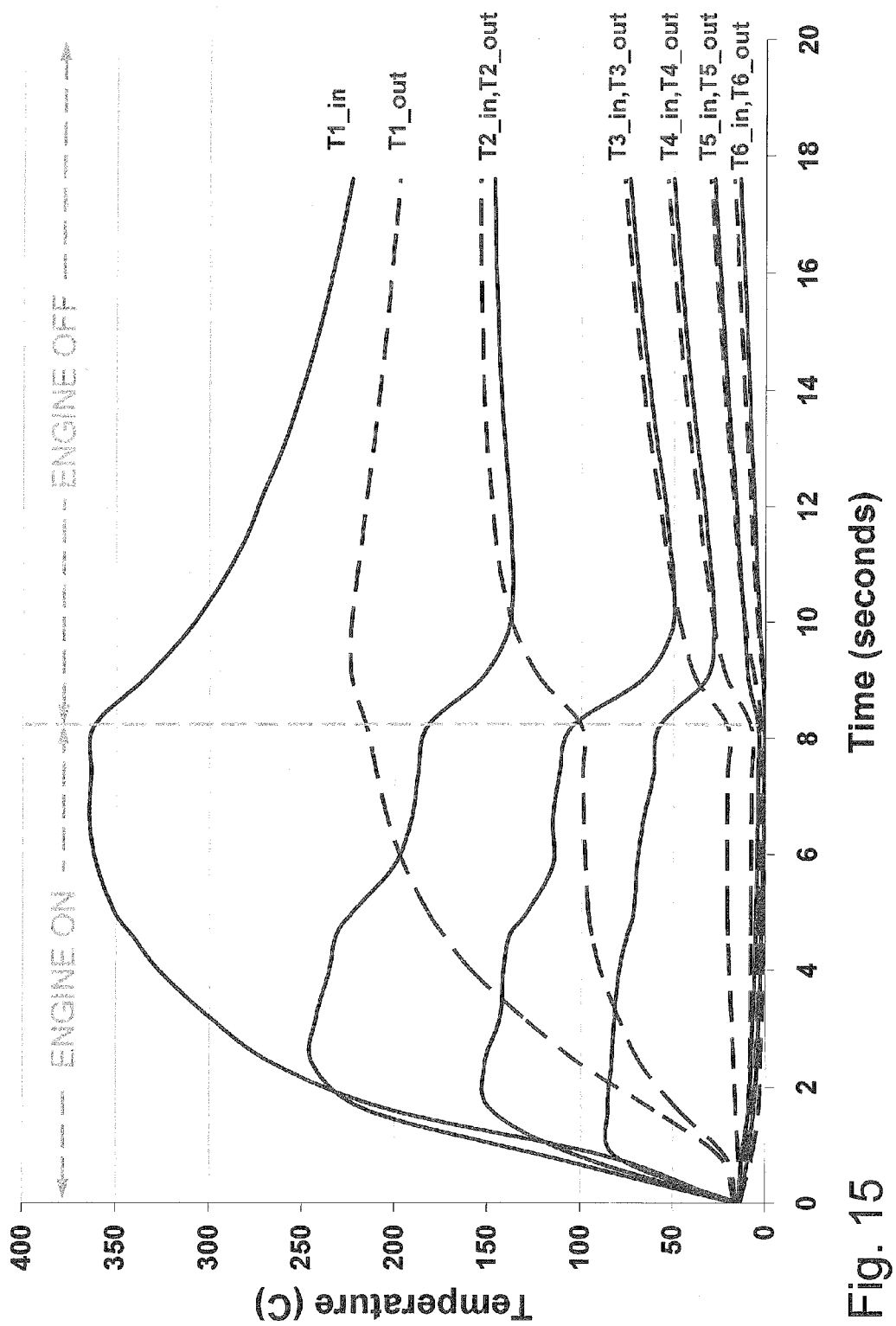
FIG. 15 shows temperatures recorded by example thermocouples at indicated locations as a function of time from the exemplary prototype engine described in Example 6.

FIG. 15 illustrates the response of the network of thermal couples embedded in the instrumented prototype engine from the same run as described above. Note that nowhere in the jacket does the jacket exceed the 400° C. limit of the exemplary NOFB monopropellant. When the engine is shut-off, the outside wall quickly absorbs heat from the inner wall helping to limit the maximum temperature that components upstream of the engine may see.

FIG. 15 also illustrates how the temperature difference between the inside and outside jacket walls increases as the engine contour grows (and the fluid velocity slows). Temperatures near the top of the engine run hotter than near the base. Heat transfer enhancements in these portions of the jacket will tend to lower the temperature difference between the inside jacket wall and outside jacket wall and effectively average out the temperature in all walls and the jacket. These enhancements will make better use of the coolant (by more closely uniformly heating the coolant) and will typically lower the maximum coolant temperature seen in the jacket.

One method for enhancing heat transport to the outside jacket involves adding a highly thermally conductive structure that will transfer heat directly to the outer jacket wall. This combination structure comprises a) a porous media jacket which transfers heat from the inside jacket wall to the propellant, and b) a direct thermal connection between the inner wall and the outer wall to transfer heat to the much cooler outer jacket wall. As a side effect, the direct thermal connection will also help strengthen the walls and allow one to reduce the mass of the walls as well.

Figure 16:
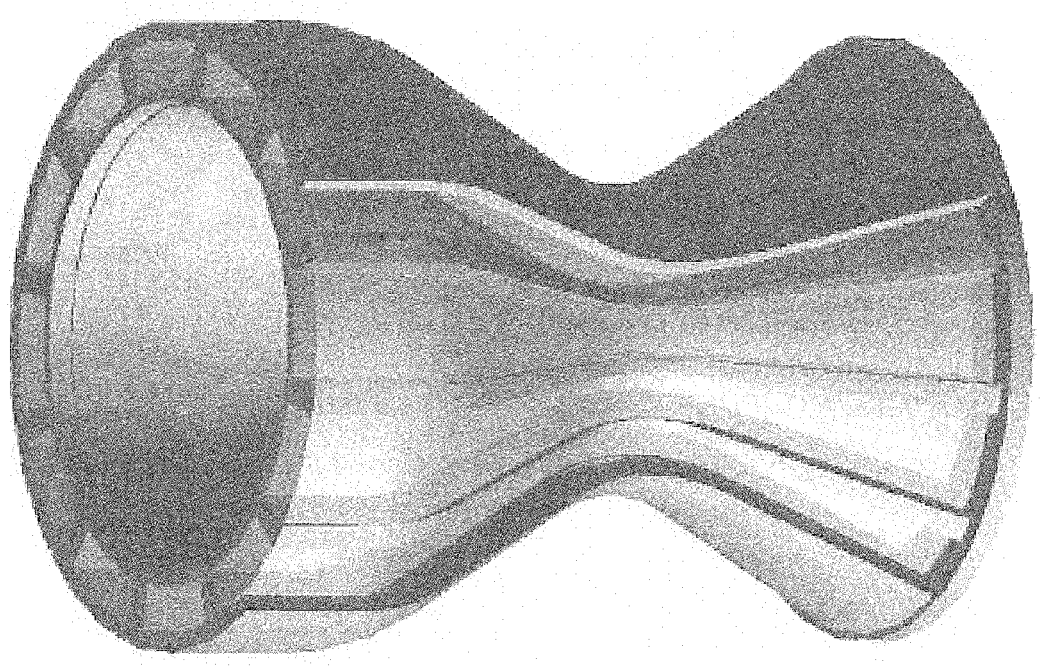
FIG. 16 illustrates an example cooling jacket with ribs described in Example 6.

The direct thermal connections may have the structure of axial ribs, spokes, or other structures. If one views a hypothetical "engine slice," such as that shown in 508 of FIG. 5, the ribs or spokes would be rays on the circle that are not etched. If the non-etched (and therefore solid metal) areas are lined up axially, then the complete structure would constitute axial ribs, such as that shown in FIG. 16. If the solid areas are radii and offset in each subsequent layer, then a spiral structure would be formed. If the solid areas are not in each layer of the structure, but only in certain layers, then spokes would be formed. Virtually any solid structure can be added to the porous media by this method. The flow of coolant can be directed into any desired path (see Example 7). In some embodiments, the surface area of all rib features represent less than about 50% of the total surface area of the outside jacket wall. If the area exceeds about 50%, the coolant begins to experience a large pressure drop, and the engine becomes quite heavy.

If the method of making the porous jacket is that used in FIG. 6, there are several options of how the ribs can be added. One can manufacture these ribs with the foam, by having the ribs machined as part of the inside liner wall (between steps 1 and 2 of FIG. 6). In this manner, step 3 of FIG. 6 would involve attaching many thinner segments of the porous media between the ribs, rather than two halves (somewhat analogous to how insulation is cut to fit between studs in a wall at home). Alternatively, the areas that are desired to contain the direct thermal connections can be drilled out of the metal foam between steps 3 and 4 of FIG. 6, and the foam material replaced with solid metal prior to addition of the outer wall.

Example 7

Regenerative Cooling with Mixing

In some embodiments, designs are made in which the fluid is more deliberately directed to move between the inner wall and the outer wall (shuttling or mixing). The additional structures used to accomplish this may be of a variety of structures, and generally are in contact with both the inner wall and the outer wall of the engine.

In one such embodiment, twisted micro-tube bundles that move the coolant through each tube from the inside jacket wall to the outside jacket wall (basically a spiral flute of tubing bundles through the jacket) are made. It has been observed that if the inside jacket throat temperatures are near the nominal temperatures of the outside wall, the peak temperatures in the engine are cooler by approximately the difference between the inside and outside chamber wall. Thus, to lower peak temperatures in the jacket it is desirable to get the heat into the propellant, and to get the inside and outside jacket walls to be near the same temperature. This mixing or shuttling design lowers the jacket temperatures thereby providing lower temperatures for coolants. This is particularly relevant with propellants that may be degraded during use as coolant, such as the NOFB monopropellant used in the examples.

Figure 18:
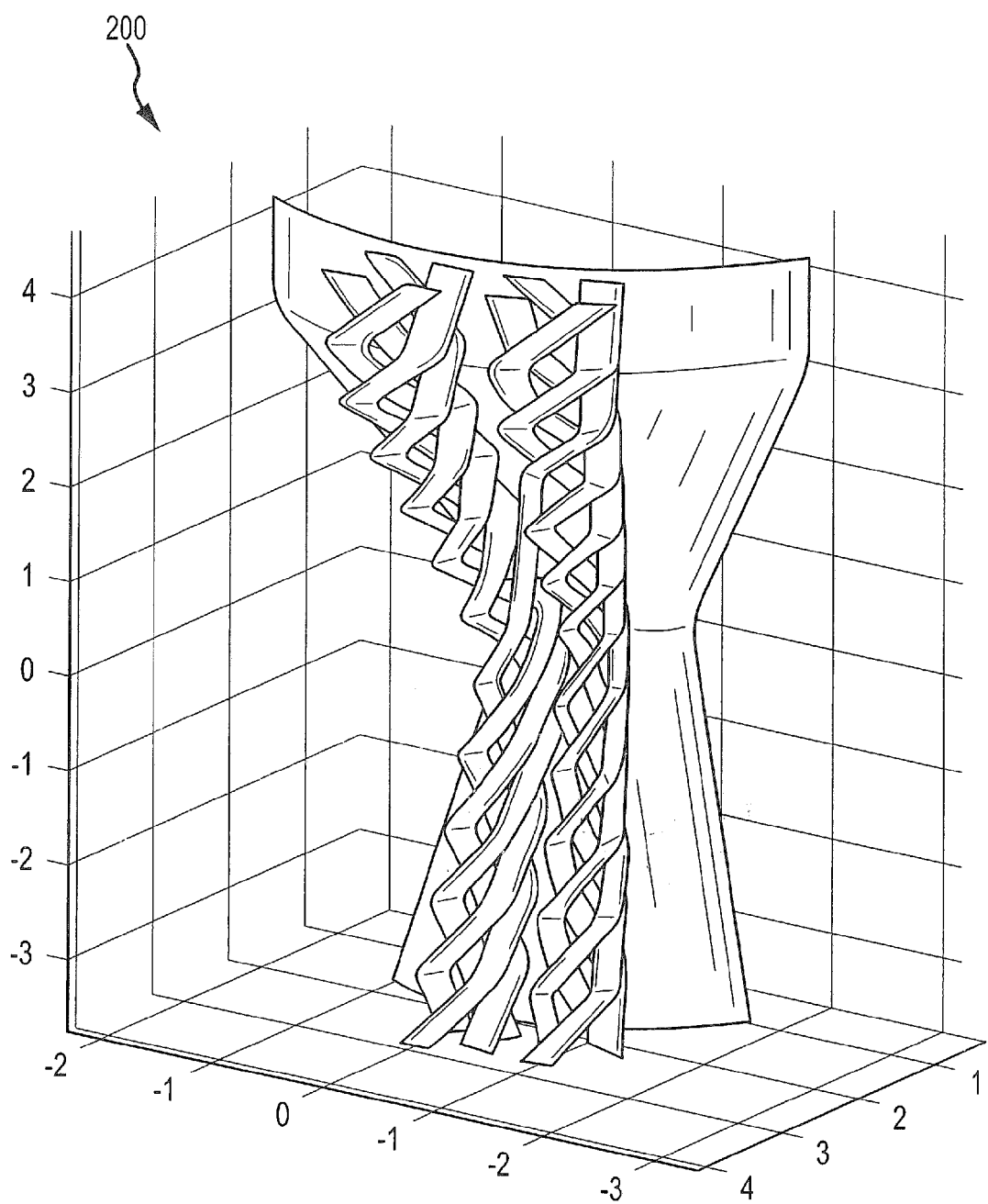
FIG. 18 illustrates an example cooling jacket with microtubes to direct the flow of the coolant.

The twisted tubes are a small micro-fluidic tube bundle (diameter of bundle is basically the jacket width). This structure is shown in FIG. 18. For ease in viewing the structure, only two bundles of micro-tubes are shown, but such bundles would generally surround the entire engine. In addition, the porous media is not shown but would occupy the space between the micro-tubes. As one moves towards the ignition source, the micro-tube bundle is twisted so that micro-tubes alternate in contact with the inside and outside jacket walls. This structure forces the fluid to move between the inside and outside walls to average these temperatures better. The diameter of the individual tubes is approximately the same as that of the hexagons discussed in Example 1. The heterogeneity in the structure may induce convection of heat between the inside and outside walls.

The model shown in Example 3 for designing the engine is based on homogeneous porous media (not containing the additional structures for direct heat transfer or mixing of fluid from inner to outer wall). For heterogeneous matrix design, one would build an experimental engine as described in Example 6 and make direct measurements of the heat flux for scaling up the engine. An experiment such as that described in Example 6 can then be used to assess the cooling and pressure drop obtained with more complex jacket designs.

The angle of the local fluid velocity vector (defined by either tube, ribbon or screw pitch much like thread pitch on a screw, etc.) is generally chosen to be between about 0 and 80 degrees. The most effective angle is selected to balance the advantage of moving the fluid back and forth between the hotter and cooler surfaces, and the pressure drop encountered if the angle is too steep. This balance is assessed with both the "open channel" micro-tube embodiment, and the ribbon or vane embodiment in which the fluid is moving in directed motion through a porous matrix that has more flow restriction.

Figure 17:
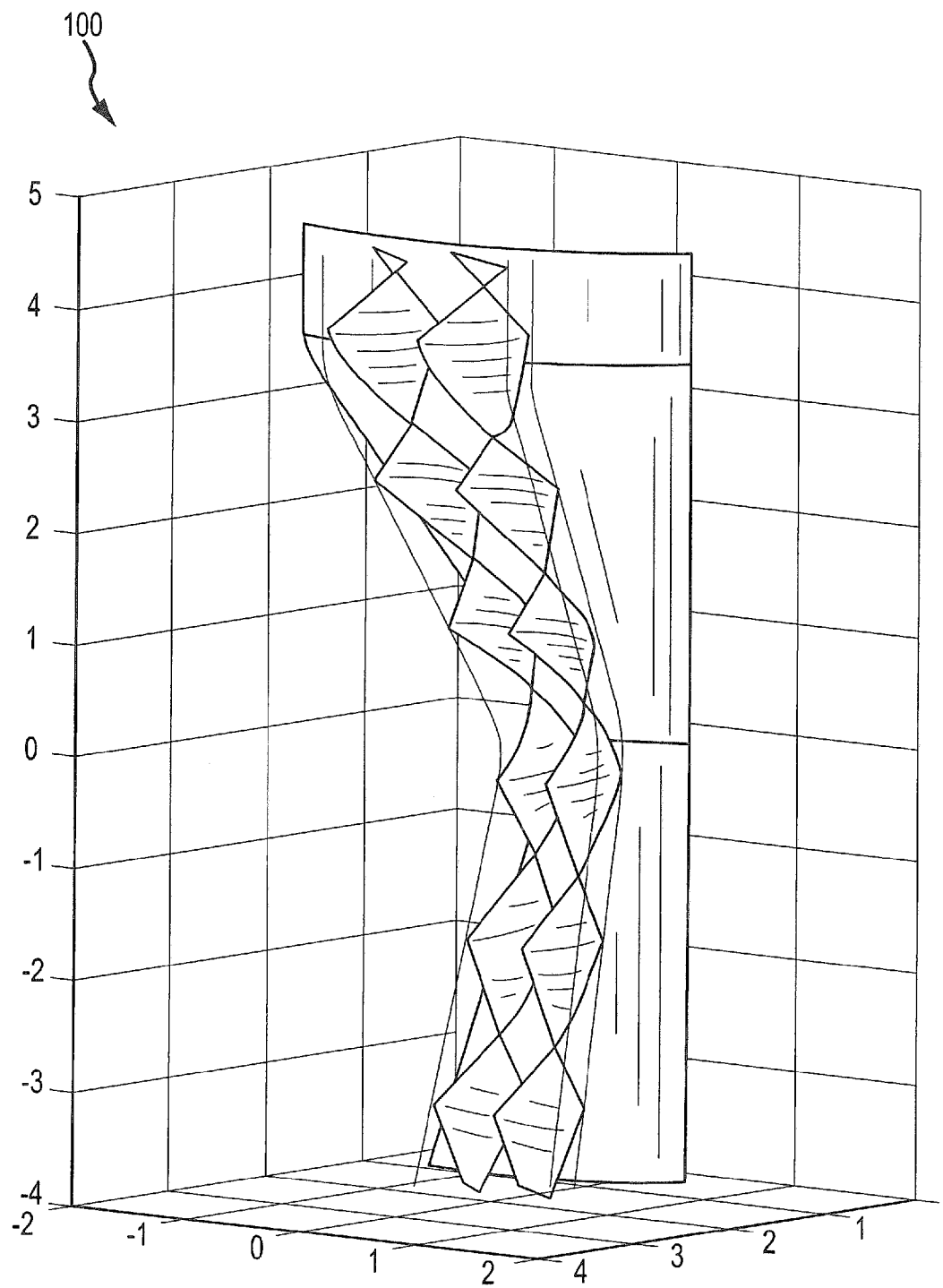
FIG. 17 illustrates an example cooling jacket with vanes to direct the flow of the coolant.

Another embodiment of the directed flow or mixing structure comprises a ribbon or vane type structure that directs the flow of the coolant. In this embodiment, the coolant flows through the porous media, but the coolant path is directed to shuttle between the inner wall and the outer wall by a curving solid metal structure (e.g., similar to a twisted ribbon structure). This structure is shown in FIG. 17. Again, for ease in viewing, only two vane structures are shown, but in jackets of this embodiment, such structures can surround the entire engine. Also the remaining space is occupied with porous media.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A rocket engine cooling jacket comprising:
 a fluid-impermeable inner wall forming a contoured chamber and a combustion chamber;
 a fluid-impermeable outer wall;
 an open cell metal foam porous media matrix between the inner wall and the outer wall, wherein the porous media matrix includes an inlet configured to receive a coolant fluid at one end of the contoured chamber and an outlet configured to expel the coolant fluid at the other end of the contoured chamber into the combustion chamber.

2. The cooling jacket of claim 1 wherein the porous media matrix comprises structures providing multiple direct thermal connections between the inner wall and the outer wall.

3. The cooling jacket of claim 1 wherein the porous media matrix comprises structures directing mixing of the coolant fluid from the inner wall to the outer wall.

4. The cooling jacket of claim 3 wherein the porous media matrix structures directing mixing of the coolant fluid from the inner wall to the outer wall include microtubes.

5. The cooling jacket of claim 3 wherein the porous media matrix structures directing mixing of the coolant fluid from the inner wall to the outer wall include ribbon structures.

6. The cooling jacket of claim 1 wherein the porous media matrix follows the contour of the contoured chamber.

7. The cooling jacket of claim 1 wherein the porous media matrix comprises a microfluidic porous lithographic structure.

8. The cooling jacket of claim 1 wherein the porous media matrix is non-catalytic to the coolant fluid.

9. The cooling jacket of claim 1 wherein the porous media matrix includes aluminum.

10. The cooling jacket of claim 1 wherein the porous media matrix includes nickel.

11. The cooling jacket of claim 1 wherein the porous media matrix includes stainless steel.

12. The cooling jacket of claim 1 wherein the porous media matrix has a porosity of less than 80%.

13. The cooling jacket of claim 1 wherein the inner wall, porous media matrix, and outer wall are formed from stacked and aligned metal layers.

14. A rocket engine cooling jacket comprising:
- a fluid-impermeable inner wall forming a cooling chamber and a combustion chamber;
- a fluid-impermeable outer wall;
- a porous media matrix between the inner wall and the outer wall, wherein the inner wall, porous media matrix, and outer wall are formed from stacked and aligned metal layers, and wherein the porous media matrix includes an inlet configured to receive a coolant fluid at one end of the cooling chamber and an outlet configured to expel the coolant fluid at the other end of the cooling chamber into the combustion chamber.

15. The cooling jacket of claim 14 wherein the porous media matrix comprises a microfluidic porous lithographic structure.

16. The cooling jacket of claim 14 wherein the porous media matrix comprises microfluidic porous metal foam.

17. The cooling jacket of claim 14 wherein the porous media matrix is non-catalytic to the coolant fluid.

18. The cooling jacket of claim 14 wherein the porous media matrix comprises open cell metal foam.

19. The cooling jacket of claim 14 wherein the porous media matrix includes aluminum.

20. The cooling jacket of claim 14 wherein the porous media matrix includes nickel.

21. The cooling jacket of claim 14 wherein the porous media matrix includes stainless steel.

22. The cooling jacket of claim 14 wherein the porous media matrix has a porosity of less than 80%.

23. A method of cooling a rocket engine comprising passing a fluid propellant coolant from a propellant tank through an inlet port, through an open cell metal foam porous media matrix that is disposed between an inner wall of the rocket engine that is fluid impermeable and an outer wall of the rocket engine that is fluid impermeable; and through an outlet port into the combustion chamber of the rocket engine.

24. The method of claim 23 wherein the porous media matrix has a porosity of less than 80%.

25. A method of cooling a rocket engine comprising passing a fluid propellant coolant from a propellant tank through an inlet port, through a microfluidic porous media matrix that is disposed between an inner wall of the rocket engine that is fluid impermeable and an outer wall of the rocket engine that is fluid impermeable, wherein the inner wall, porous media matrix, and outer wall are formed from stacked and aligned metal layers; and through an outlet port into the combustion chamber of the rocket engine.

26. The method of claim 25 wherein the porous media matrix has a porosity of less than 80%.

* * * * *